United States Patent
Yu

(10) Patent No.: US 9,891,874 B2
(45) Date of Patent: Feb. 13, 2018

(54) NON-TRANSITORY COMPUTER-READABLE STORAGE MEDIUM STORING DISTRIBUTED PRINTING CONTROL PROGRAM, AND DISTRIBUTED PRINTING CONTROL APPARATUS

(71) Applicant: KONICA MINOLTA, INC., Chiyoda-ku, Tokyo (JP)

(72) Inventor: Kazutoshi Yu, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/173,351

(22) Filed: Jun. 3, 2016

(65) Prior Publication Data
US 2016/0364193 A1 Dec. 15, 2016

(30) Foreign Application Priority Data
Jun. 11, 2015 (JP) .................................. 2015-118111

(51) Int. Cl.
G06F 3/12 (2006.01)
H04N 1/00 (2006.01)

(52) U.S. Cl.
CPC ............ G06F 3/1241 (2013.01); G06F 3/126 (2013.01); G06F 3/1215 (2013.01);
(Continued)

(58) Field of Classification Search
USPC ....................................... 358/1.15
See application file for complete search history.

(56) References Cited

U.S. PATENT DOCUMENTS

| | | | |
|---|---|---|---|
| 6,970,261 B1* | 11/2005 | Robles | G06F 3/1215 358/1.14 |
| 2002/0163666 A1* | 11/2002 | Iwata | G06F 3/1205 358/1.15 |
| 2012/0050796 A1 | 3/2012 | Yokokura | |

FOREIGN PATENT DOCUMENTS

| | | | |
|---|---|---|---|
| JP | 10207643 A | 8/1998 | |
| JP | 11053128 A | 2/1999 | |

(Continued)

OTHER PUBLICATIONS

Japanese Office Action (and English translation thereof) dated May 19, 2017 issued in counterpart Japanese Application No. 2015-118111.

*Primary Examiner* — Ngon Nguyen
(74) *Attorney, Agent, or Firm* — Holtz Holtz & Volek PC

(57) ABSTRACT

Provided is a non-transitory computer-readable storage medium storing a program for controlling distributed printing to be executed in a distributed printing system including at least plural image forming apparatuses. The program, when being executed, causes an apparatus in the distributed printing system to perform the following processing of controlling distributed printing. The processing includes dividing a print job into job portions, and distributing the job portions to virtual queues corresponding to the image forming apparatuses, respectively. The processing further includes sequentially sending, to each of the image forming apparatuses, job portions in the corresponding virtual queue, in accordance with a status of job processing of the each of the image forming apparatuses, and moving one or more job portions from one to another of the virtual queues so as to keep a ratio of the numbers of job portions remaining in the virtual queues constant.

24 Claims, 18 Drawing Sheets

(52) U.S. Cl.
CPC ....... *G06F 3/1288* (2013.01); *H04N 1/00204* (2013.01); *H04N 1/00347* (2013.01); *H04N 2201/0094* (2013.01)

(56) References Cited

FOREIGN PATENT DOCUMENTS

| | | |
|---|---|---|
| JP | 2004102945 A | 4/2004 |
| JP | 2012053624 A | 3/2012 |

* cited by examiner

FIG. 11

DEVICE QUEUE OF PRINTER A

| JOB PORTIONS | STATUS |
|---|---|
| A1 | PRINTED |
| A2 | PRINTED |
| A3 | PROCESSING |
| A4 | TRANSFERRING |

DEVICE QUEUE OF PRINTER B

| JOB PORTIONS | STATUS |
|---|---|
| B1 | PRINTED |
| B2 | PRINTED |
| B3 | PRINTED |
| B4 | PRINTED |
| B5 | PROCESSING |
| B6 | TRANSFERRING |

VIRTUAL QUEUE OF PRINTER A

| |
|---|
| A5 |
| A6 |
| A7 |
| ⋮ |
| A47 |
| A48 |
| A49 |
| (A50) |
| |
| |

VIRTUAL QUEUE OF PRINTER B

| |
|---|
| B7 |
| B8 |
| B9 |
| ⋮ |
| B49 |
| B50 |
| A50 |
| |
| |
| |

FIG. 12

DEVICE QUEUE OF PRINTER A

| JOB PORTIONS | STATUS |
|---|---|
| | |
| | |
| | |

DEVICE QUEUE OF PRINTER B

| JOB PORTIONS | STATUS |
|---|---|
| | |
| | |
| | |

VIRTUAL QUEUE OF PRINTER A

| |
|---|
| 1-100 |
| 101-200 |
| 201-300 |
| 301-400 |
| 401-500 |
| 501-600 |
| 601-700 |
| 701-800 |
| 801-900 |
| 901-1000 |
| |
| |

VIRTUAL QUEUE OF PRINTER B

| |
|---|
| 2000-1901 |
| 1900-1801 |
| 1800-1701 |
| 1700-1601 |
| 1600-1501 |
| 1500-1401 |
| 1400-1301 |
| 1300-1201 |
| 1200-1101 |
| 1100-1001 |
| |
| |

FIG. 13

DEVICE QUEUE OF PRINTER A

| JOB PORTIONS | STATUS |
|---|---|
| 1-100 | PRINTING |
| 101-200 | PROCESSING |
| 201-300 | TRANSFERRING |
| | |

DEVICE QUEUE OF PRINTER B

| JOB PORTIONS | STATUS |
|---|---|
| 2000-1901 | PRINTING |
| 1900-1801 | PROCESSING |
| 1800-1701 | TRANSFERRING |
| | |

VIRTUAL QUEUE OF PRINTER A

| |
|---|
| 301-400 |
| 401-500 |
| 501-600 |
| 601-700 |
| 701-800 |
| 801-900 |
| 901-1000 |
| |
| |
| |
| |

VIRTUAL QUEUE OF PRINTER B

| |
|---|
| 1700-1601 |
| 1600-1501 |
| 1500-1401 |
| 1400-1301 |
| 1300-1201 |
| 1200-1101 |
| 1100-1001 |
| |
| |
| |
| |

FIG. 14

DEVICE QUEUE OF PRINTER A

| JOB PORTIONS | STATUS |
|---|---|
| 1-400 | PRINTED |
| 401-500 | PROCESSING |
| 501-600 | TRANSFERRING |
| | |

DEVICE QUEUE OF PRINTER B

| JOB PORTIONS | STATUS |
|---|---|
| 2000-1901 | PRINTED |
| 1900-1801 | SUSPENDED |
| 1800-1701 | WAITING FOR PRINTING |
| | |

VIRTUAL QUEUE OF PRINTER A

| |
|---|
| 601-700 |
| 701-800 |
| 801-900 |
| 901-1000 |
| 1001-1100 |
| |
| |
| |
| |
| |

VIRTUAL QUEUE OF PRINTER B

| |
|---|
| 1700-1601 |
| 1600-1501 |
| 1500-1401 |
| 1400-1301 |
| 1300-1201 |
| 1200-1101 |
| (1100-1001) |
| |
| |
| |
| |

FIG. 17

DEVICE QUEUE OF PRINTER A

| JOB PORTIONS | STATUS |
|---|---|
|  |  |
|  |  |
|  |  |
|  |  |

DEVICE QUEUE OF PRINTER B

| JOB PORTIONS | STATUS |
|---|---|
|  |  |
|  |  |
|  |  |
|  |  |

VIRTUAL QUEUE OF PRINTER A

| A1 |
|---|
| A2 |
| A3 |
| A4 |
| A5 |
| ⋮ |
| A18 |
| A19 |
| A20 |
|  |
|  |

VIRTUAL QUEUE OF PRINTER B

| B1 |
|---|
| B2 |
| B3 |
| B4 |
| B5 |
| ⋮ |
| B38 |
| B39 |
| B40 |
|  |
|  |

FIG. 18

DEVICE QUEUE OF PRINTER A

| JOB PORTIONS | STATUS |
|---|---|
| A1-A14 | PRINTED |
| A15 | PROCESSING |
| A16 | TRANSFERRING |
|  |  |

DEVICE QUEUE OF PRINTER B

| JOB PORTIONS | STATUS |
|---|---|
| B1-B28 | PRINTED |
| B29 | PROCESSING |
| B30 | TRANSFERRING |
|  |  |

VIRTUAL QUEUE OF PRINTER A

| A17 |
|---|
| A18 |
| A19 |
| A20 |
|  |
|  |
|  |
|  |
|  |
|  |

VIRTUAL QUEUE OF PRINTER B

| B31 |
|---|
| B32 |
| B33 |
| B34 |
| B35 |
| B36 |
| B37 |
| B38 |
| B39 |
| B40 |
|  |

FIG. 19

DEVICE QUEUE OF PRINTER A

| JOB PORTIONS | STATUS |
|---|---|
| | |
| | |
| | |
| | |

DEVICE QUEUE OF PRINTER B

| JOB PORTIONS | STATUS |
|---|---|
| | |
| | |
| | |
| | |

VIRTUAL QUEUE OF PRINTER A

| |
|---|
| 1-100 |
| 101-200 |
| 201-300 |
| 301-400 |
| 401-500 |
| 501-600 |
| |
| |
| |
| |
| |

VIRTUAL QUEUE OF PRINTER B

| |
|---|
| 1800-1701 |
| 1700-1601 |
| 1600-1501 |
| 1500-1401 |
| 1400-1301 |
| 1300-1201 |
| 1200-1101 |
| 1100-1001 |
| 1000-901 |
| 900-801 |
| 800-701 |
| 700-601 |

FIG. 20

DEVICE QUEUE OF PRINTER A

| JOB PORTIONS | STATUS |
|---|---|
| 1-300 | PRINTED |
| 301-400 | PROCESSING |
| 401-500 | TRANSFERRING |
| | |

DEVICE QUEUE OF PRINTER B

| JOB PORTIONS | STATUS |
|---|---|
| 1800-1201 | PRINTED |
| 1200-1101 | PROCESSING |
| 1100-1001 | TRANSFERRING |
| | |

VIRTUAL QUEUE OF PRINTER A

| |
|---|
| 501-600 |
| |
| |
| |
| |
| |
| |
| |
| |
| |

VIRTUAL QUEUE OF PRINTER B

| |
|---|
| 1000-901 |
| 900-801 |
| 800-701 |
| 700-601 |
| |
| |
| |
| |
| |
| |

NON-TRANSITORY COMPUTER-READABLE STORAGE MEDIUM STORING DISTRIBUTED PRINTING CONTROL PROGRAM, AND DISTRIBUTED PRINTING CONTROL APPARATUS

The entire disclosure of Japanese Patent Application No. 2015-118111 filed on Jun. 11, 2015 including description, claims, drawings, and abstract are incorporated herein by reference in its entirety.

TECHNICAL FIELD

The present invention relates to a non-transitory computer-readable storage medium storing a distributed printing control program to be executed in an apparatus in a distributed printing system, including a plurality of image forming apparatuses, and a distributed printing control apparatus that controls distributed printing to be performed by using a plurality of image forming apparatuses.

BACKGROUND

In recent years, distributed printing, a technology to distribute one or more print jobs to plural image forming apparatuses and print the one or more print job with the apparatuses together, is employed in offices and other facilities where plural image forming apparatuses are installed, in order to process a large printing load efficiently. This distributed printing includes processes to distribute one or more print jobs to plural image forming apparatuses and to process the one or more print jobs on the plural image forming apparatuses, and therefore needs appropriate job scheduling so as to realize efficient execution of the distributed printing.

DESCRIPTION OF THE RELATED ART

As an example of a technique with regard to job scheduling, which is not a technique with regard to distributed printing, Japanese Unexamined Patent Publication (JP-A) No. 2004-102945 discloses a print-job scheduling method which includes the steps of producing a logical printer to manage a plurality of physical printers collectively, linking the logical printer with the plurality of physical printers, obtaining a list of jobs in a queue of the logical printer, and assigning the jobs in the queue of the logical printer to queues of the physical printers.

As another example, JP-A No. 2012-053624 (corresponding to US Patent Application Publication No. US2012/0050796A1) discloses a printing apparatus which includes a judging section and a receiving section. In the printing apparatus, in response to an input of an instruction to print document data stored in a server system, the judging section requests a job ticket of the document data for the server system, and judges with reference to the job ticket received from the server system in response to the request whether the document data has been divided into a plurality of job portions or not. When the judging section has judged that the document data has been divided, the receiving section performs the following processing depending on the status of the printing apparatus. If the printing apparatus is in a state capable of printing, the receiving section requests divided portions of the document data for the server system to receive the divided portions of the document data in order described in the job ticket. If the printing apparatus is in a state incapable of printing, the receiving section requests divided portions of the document data for the server system to receive the divided portions of the document data in parallel.

In one type of distributed printing in which a plurality of print jobs are divided into groups of print jobs and the groups of print jobs are distributed to respective image forming apparatuses, each print job is independent from others, and therefore, there is no need to coincide the finishing times of job processing of the respective image forming apparatuses (that is, times when printed sheets are output from the respective image forming apparatuses) with each other. On the other hand, in another type of distributed printing in which one print job is divided into plural job portions and the job portions are distributed to plural image forming apparatuses, printed sheets output separately from the image forming apparatuses are needed to be gathered. Therefore, there is a need to coincide the finishing times of job processing of the respective image forming apparatuses with each other, in this type of distributed printing. In particular, in a case that the printed sheets, which were output separately from plural image forming apparatuses and then gathered, need finishing operations such as punching and stapling, the following matter can arise. In this case, a delay of the output from one of image forming apparatuses prevents the finishing operations from being instantly performed, until the output of the image forming apparatus has been completed. Therefore, in the distributed printing which employs processes of dividing a print job into job portions and distributing the divided job portions to image forming apparatuses, it is necessary to control distribution of job portions properly so as to coincide the finishing times of job processing of plural image forming apparatuses with each other.

As a method of controlling job distribution, consideration may be given to a method of distributing a same amount of job portion to each image forming apparatus in advance of the start of job processing of the image forming apparatuses. However, with this method, image forming apparatuses whose processing capacities are not the same do not finish their job processing at the same time. As another method, consideration may be given to a method of distributing job portions to image forming apparatuses at a ratio of the processing capacities of the image forming apparatuses in advance of the start of job processing of the image forming apparatuses. However, with this method, occurrence of a trouble, such as out of paper and a paper jam, in any one of the image forming apparatuses, makes a delay of the job processing of the image forming apparatus, and such the delay prevents the image forming apparatuses from finishing their job processing at the same time.

SUMMARY

Aspects of the present invention are directed to non-transitory computer-readable storage media each storing a distributed printing control program and distributed printing control apparatuses, for distributing a print job among plural image forming apparatuses and processing the print job with the image forming apparatuses together.

A non-transitory computer-readable storage medium reflecting one aspect of the present invention stores a program for controlling distributed printing to be executed in a distributed printing system. The distributed printing system includes at least a plurality of image forming apparatuses on which a print job is to be processed. The program, when being executed by a processor of an apparatus in the distributed printing system, causes the apparatus to perform the following processing. The processing comprises dividing a print job into a plurality of job portions; and distributing the job portions to a plurality of virtual queues prepared in the apparatus, where the plurality of virtual queues correspond to the plurality of image forming apparatuses, respectively. The processing further comprises sequentially sending, to each of the plurality of image forming apparatuses, job portions in the virtual queue corresponding to the each of the plurality of image forming apparatuses, in accordance with a status of job processing of the each of the plurality of image forming apparatuses. The processing further comprises moving one or more job portions from one to another of the plurality of virtual queues so as to keep a ratio of numbers of job portions remaining in the plurality of virtual queues constant.

A distributed printing control apparatus reflecting one aspect of the present invention is a distributed printing control apparatus which controls a plurality of image forming apparatuses on which a print job is to be processed. The distributed printing control apparatus comprises a plurality of virtual queues corresponding to the plurality of image forming apparatuses, respectively; a job dividing section that divides a print job into a plurality of job portions; and a status monitoring section that monitors a status of job processing of each of the plurality of image forming apparatuses. The distributed printing control apparatus further comprises a job control section. The job control section distributes the job portions to the plurality of virtual queues, and sequentially sends, to each of the plurality of image forming apparatuses, job portions in the virtual queue corresponding to the each of the plurality of image forming apparatuses, in accordance with a status of job processing of the each of the plurality of image forming apparatuses. The job control section further moves one or more job portions from one to another of the plurality of virtual queues so as to keep a ratio of numbers of job portions remaining in the plurality of virtual queues constant.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 11 is a diagram illustrating an example of management of the number of copies remaining to be printed of a print job (at the time after two minutes have elapsed) according to Example 1;

FIG. 12 is a diagram illustrating an example of management of the number of pages remaining to be printed of a print job (in an initial state) according to Example 1;

FIG. 13 is a diagram illustrating an example of management of the number of pages remaining to be printed of a print job (at a start of printing) according to Example 1;

FIG. 14 is a diagram illustrating an example of management of the number of pages remaining to be printed of a print job (at the time after two minutes have elapsed) according to Example 1;

FIG. 17 is a diagram illustrating an example of management of the number of copies remaining to be printed of a print job (in an initial state) according to Example 2;

FIG. 18 is a diagram illustrating an example of management of the number of copies remaining to be printed of a print job (at the time after fourteen minutes have elapsed) according to Example 2;

FIG. 19 is a diagram illustrating an example of management of the number of pages remaining to be printed of a print job (in an initial state) according to Example 2;

FIG. 20 is a diagram illustrating an example of management of the number of pages remaining to be printed of a print job (at the time after three minutes have elapsed) according to Example 2;

DESCRIPTION OF THE PREFERRED EMBODIMENTS

Figure 1:
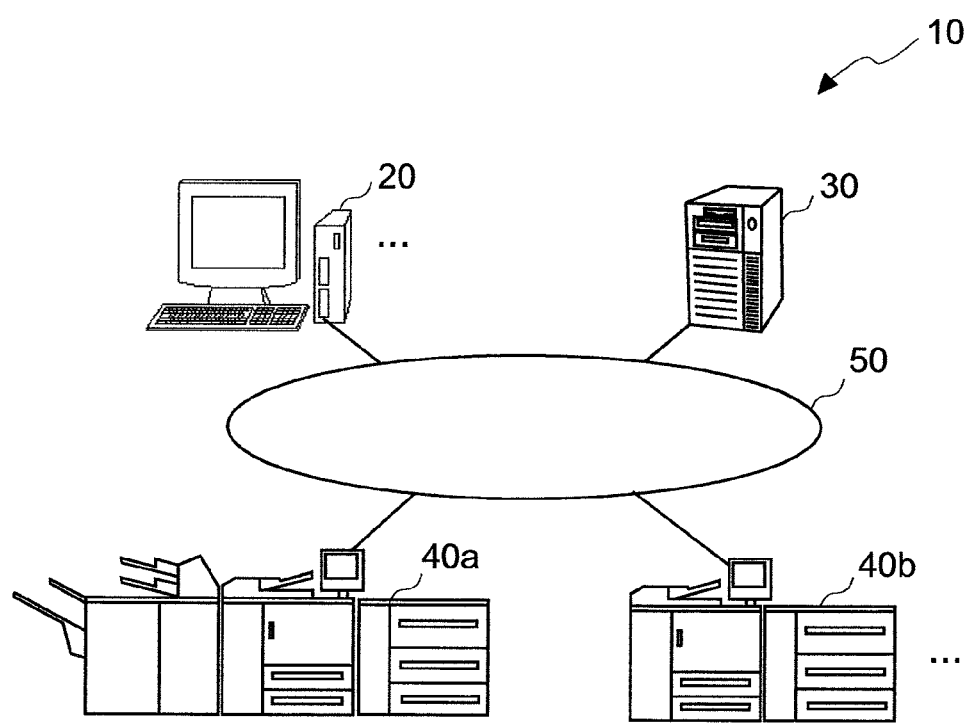
FIG. 1 is a drawing schematically illustrating an example of the constitution of a distributed printing system according to Example 1.

Hereinafter, an embodiment of the present invention will be described with reference to the drawings. However, the scope of the invention is not limited to the illustrated examples.

According to non-transitory computer-readable storage media each storing a distributed printing control program and distributed printing control apparatuses, as embodiment of the present invention, in distributed printing in which a print job is divided into job portions to be distributed to and printed on plural image forming apparatuses, finishing times of job processing of the plural image forming apparatuses can be adjusted to coincide with each other and efficient processing of the print job is realized, for the following reason.

That is, a distributed printing control apparatus performs the following processing (in other words, a distributed printing control program, when being executed, causes an apparatus in a distributed printing system to perform the following processing). In the distributed printing control apparatus (or the apparatus executing the distributed printing control program), there are prepared plural virtual queue corresponding to image forming apparatuses on which a print job is to be processed. The processing includes dividing a print job into plural job portions and distributing the job portions to the virtual queues (for example, equally or at a specific ratio) in advance of job processing of the image forming apparatuses. The processing further includes sequentially sending job portions to each of the image forming apparatuses from the corresponding virtual queue while monitoring the status of processing of each of the image forming apparatuses, and moving one or more job portions from one to another of the virtual queues so as to keep the ratio of the numbers of job portions in the virtual queues constant (for example, to be equal to each other or in the specific ratio).

As described in the section of BACKGROUND, distributed printing in which one or more print jobs are processed on plural image forming apparatuses, is now being employed. In the distributed printing in which one print job is divided into plural pieces (referred to as job portions) and the job portions are distributed to plural image forming apparatuses, there is a need to gather printed sheets output separately from the plural image forming apparatuses. Therefore, in such distributed printing, it is necessary to control the job processing so as to coincide finishing times of job processing of the plural image forming apparatuses.

As a method to solve the above matter, consideration may be given to a method of distributing a same amount of job portion to each image forming apparatus in advance of the start of job processing if the image forming apparatuses. However, with this method, the finishing times of job processing do not coincide with each other among image forming apparatuses whose processing capacities are not the same. As another method, consideration may be given to a method of distributing job portions to image forming apparatuses at a ratio of the processing capacities of the image forming apparatuses in advance of the start of job processing of the image forming apparatuses. However, with this method, occurrence of a trouble, such as out of paper and a paper jam, in any one of the image forming apparatuses, makes a delay of the job processing of the image forming apparatus, and therefore, the finishing times of job processing of the image forming apparatus do not coincide with each other due to the delay.

In other words, a time period required until the processing of a job has been completed may change not only due to a difference among the processing capacities of the image forming apparatuses, but also due to the existence or non-existence of a trouble such as out of paper and a paper jam in any of the image forming apparatuses. Accordingly, with the method of distributing jobs or job portions to image forming apparatuses before the start of job processing, the image forming apparatuses do not always finish their job processing at the same time. It can cause wasteful waiting time for completion of the job processing of all the image forming apparatuses, can delay a start of finishing operations of the printed matter output by the image forming apparatuses, and can prevent processing of the next print job from starting, which are problems.

In view of that, one embodiment of the present invention provides distributed printing such that a print job is divided into plural job portions to be processed on plural image forming apparatuses, where job portions are plural clusters of certain print contents (for example, a specific number of copies to be printed or a specific number of pages to be printed). Such the distributed printing is realized by causing a distributed printing control apparatus (or an apparatus which serves as the distributed printing control apparatus) in a distributed printing system, to perform the following processing. In the distributed printing control apparatus (or the apparatus which serves as the distributed printing control apparatus), there are prepared plural virtual queues in which job portions are queued to be sent to respective image firming apparatuses. The processing includes dividing a print job into plural job portions, and distributing the job portions to the plural virtual queues. The processing further includes sending, to each of the plural image forming apparatuses, minimum necessary job portions from the corresponding virtual queue by monitoring a status of job processing of each of the image forming apparatuses, and moving one or more job portions from one to another of the virtual queues so as to keep a ratio of numbers of job portions remaining in the plurality of virtual queues constant (for example, to be equal to each other or at a specific ratio). In other words, rather than sending or distributing all the job portions directly to the image forming apparatuses before execution of job processing in the image forming apparatuses, the distributed printing control apparatus (or the apparatus in the distributed printing system) distributes the job portions to the virtual queues to temporarily queue the job portions in the virtual queues, and sequentially sends job portions in each of the virtual queues to the corresponding image forming apparatuses in accordance with the status of job processing of the corresponding image forming apparatus. As for the job portions remaining in the virtual queues to be sent to the image forming apparatuses, the distributed printing control apparatus (or the apparatus) controls the job portions so as to keep the ratio of the numbers of job portions remaining in the virtual queues constant (for example, to be equal to each other or in a specific ratio).

In this way, in the distributed printing, a print job is divided into job portions and the numbers of the job portions remaining in virtual queues are kept to be equal to each other or in a specific ratio. Such processes cause the image forming apparatuses to finish their job processing at the same time even when the processing capacities of the image forming apparatus are uneven or when any trouble, such as out of paper or a paper jam, arises. It prevents occurrence of useless waiting time for completion of job processing of all the image forming apparatuses and realizes efficient processing of a print job.

EXAMPLES

Example 1

Figure 3A:
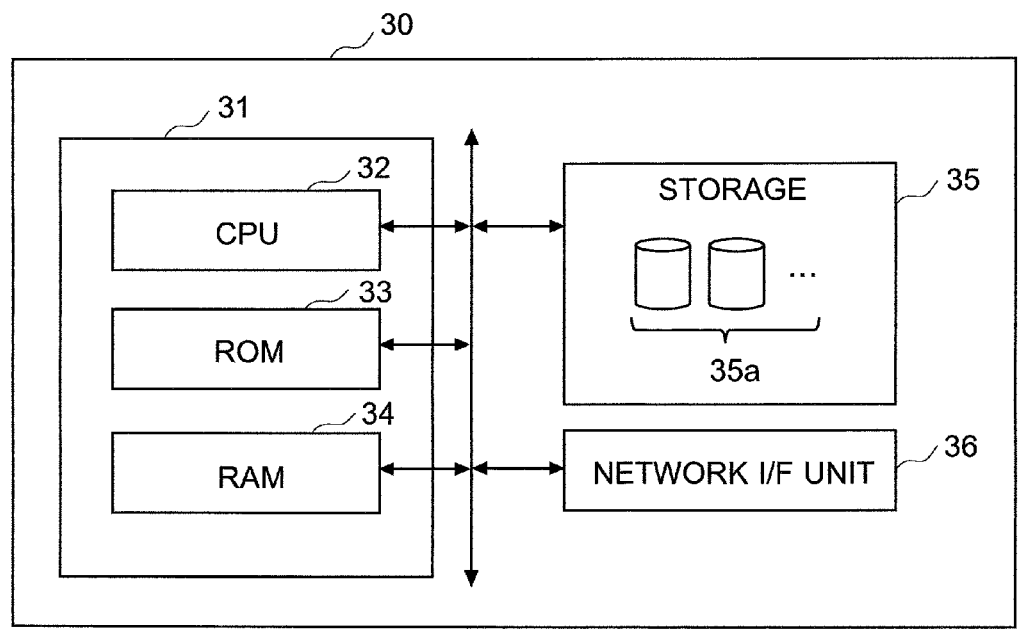
FIGS. 3A and 3B are block diagrams illustrating an example of the constitution of a distributed printing control apparatus according to Example 1.
Figure 3B:
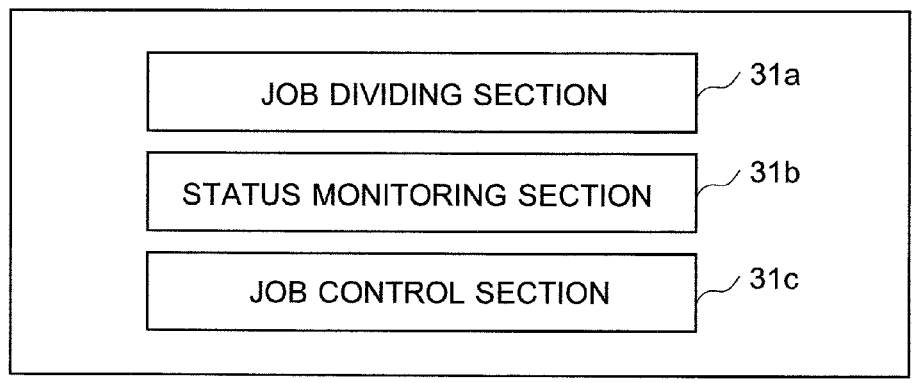
Figure 4:
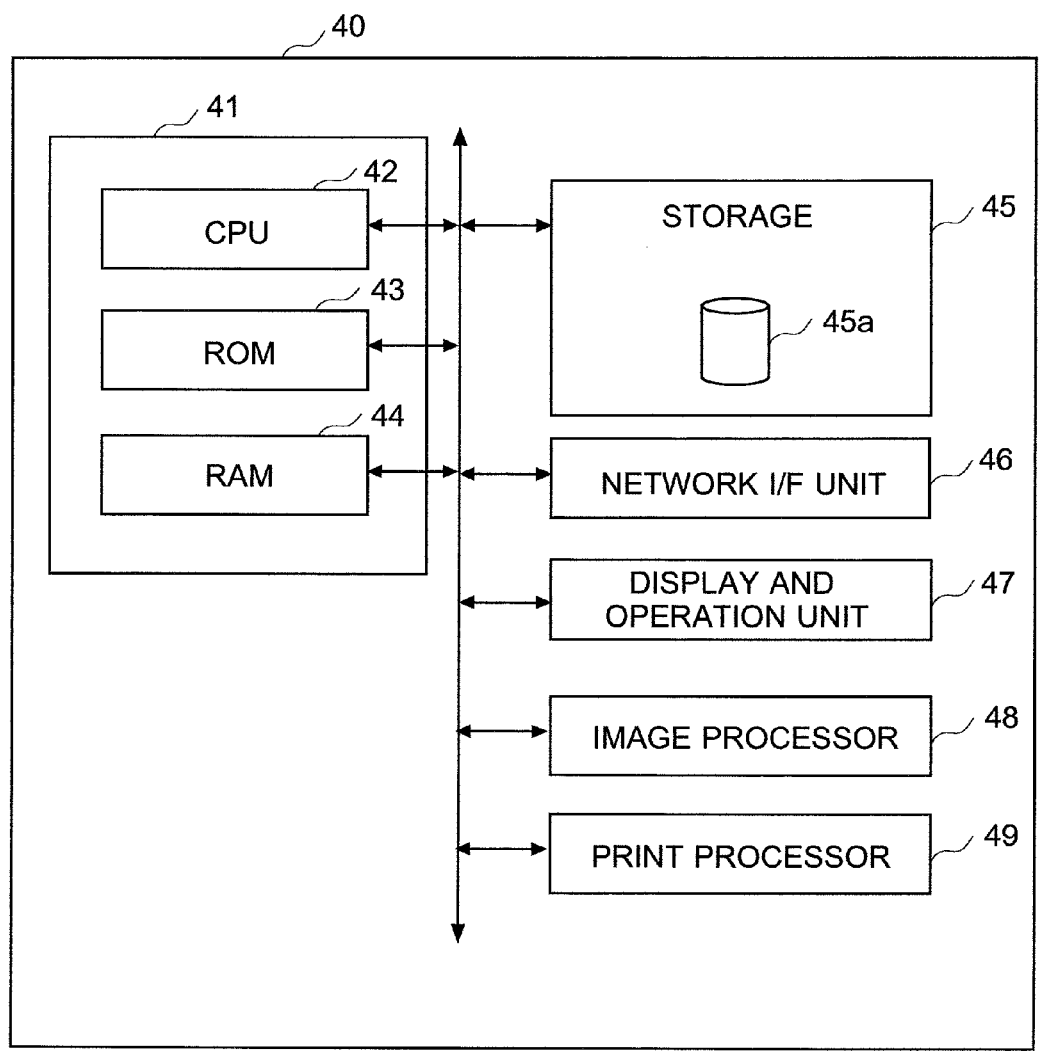
FIG. 4 is a block diagram illustrating an example of the constitution of an image forming apparatus according to Example 1.
Figure 5:
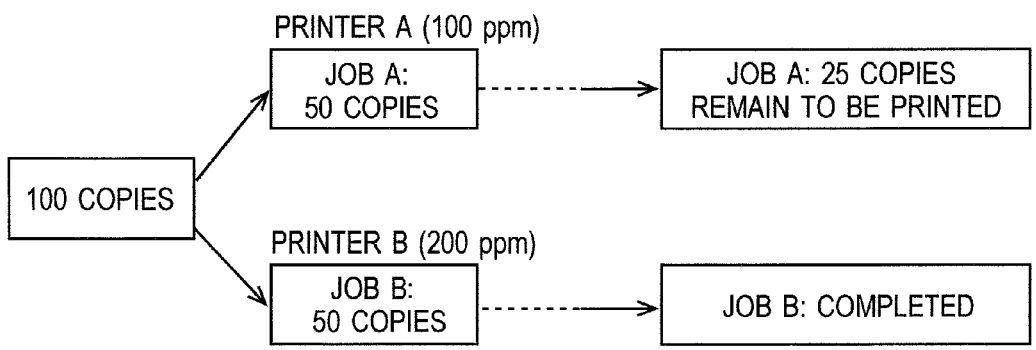
FIG. 5 is a diagram for illustrating a problem relating to conventional distributed printing (in a case that a print job is divided according to the number of copies to be printed)
Figure 6:
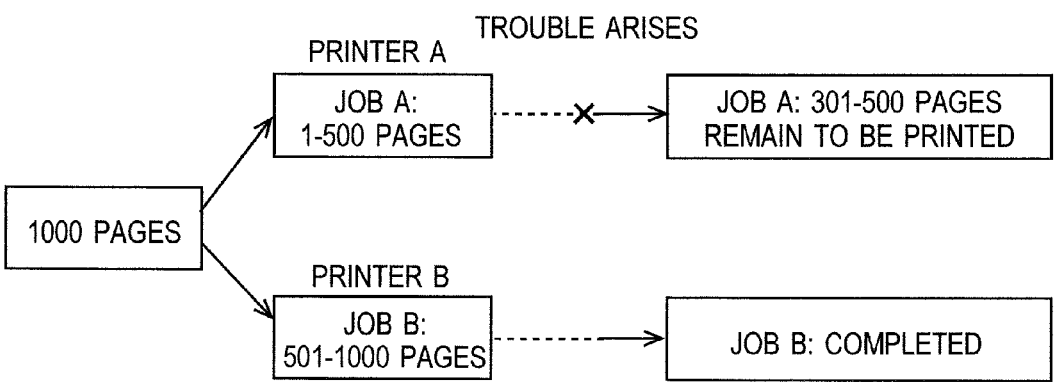
FIG. 6 is a diagram for illustrating a problem relating to conventional distributed printing (in a case that a print job is divided according to the number of pages)
Figure 7:
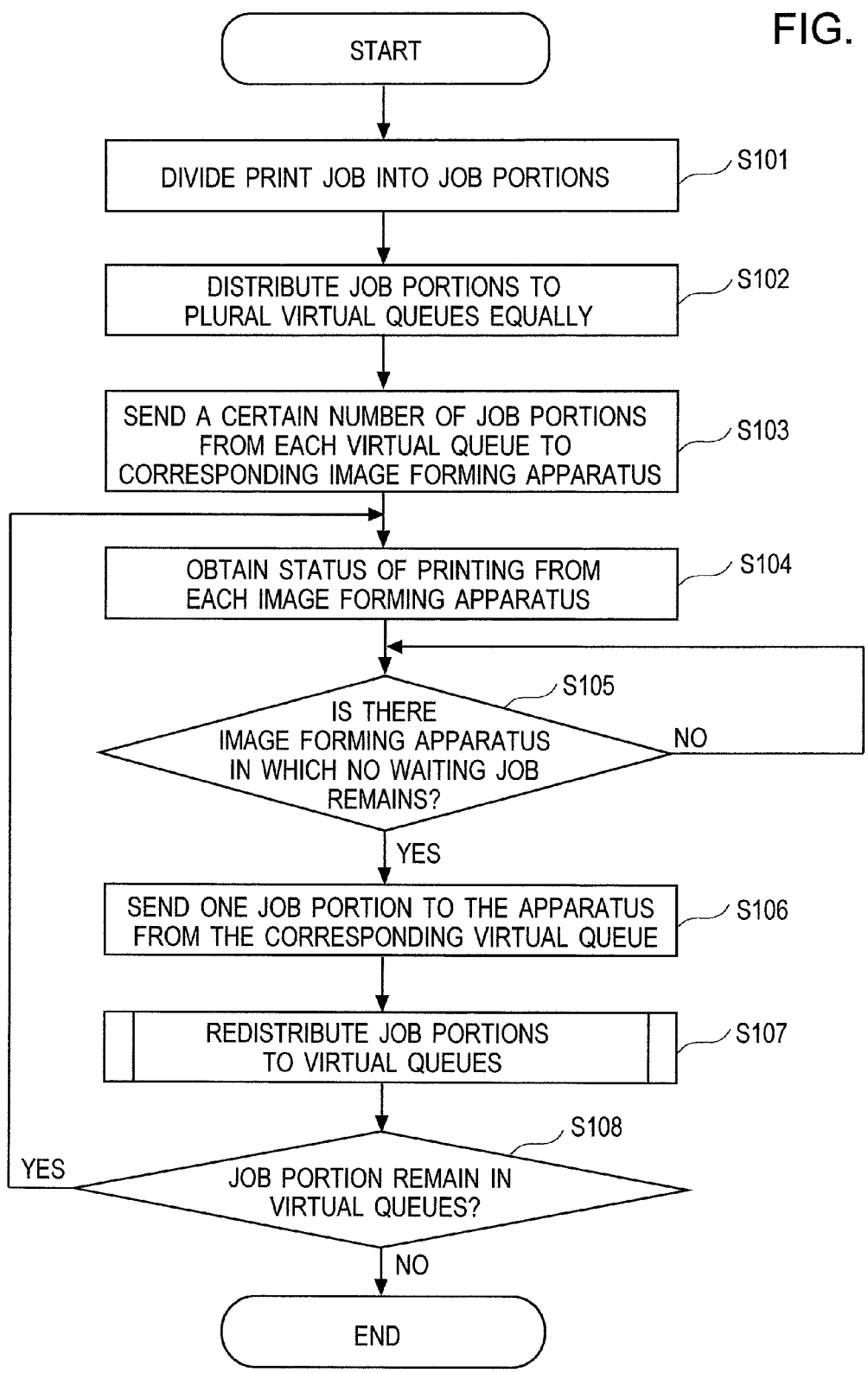
FIG. 7 is a flowchart illustrating an example of the operation of the distributed printing control apparatus according to Example 1.
Figure 8:
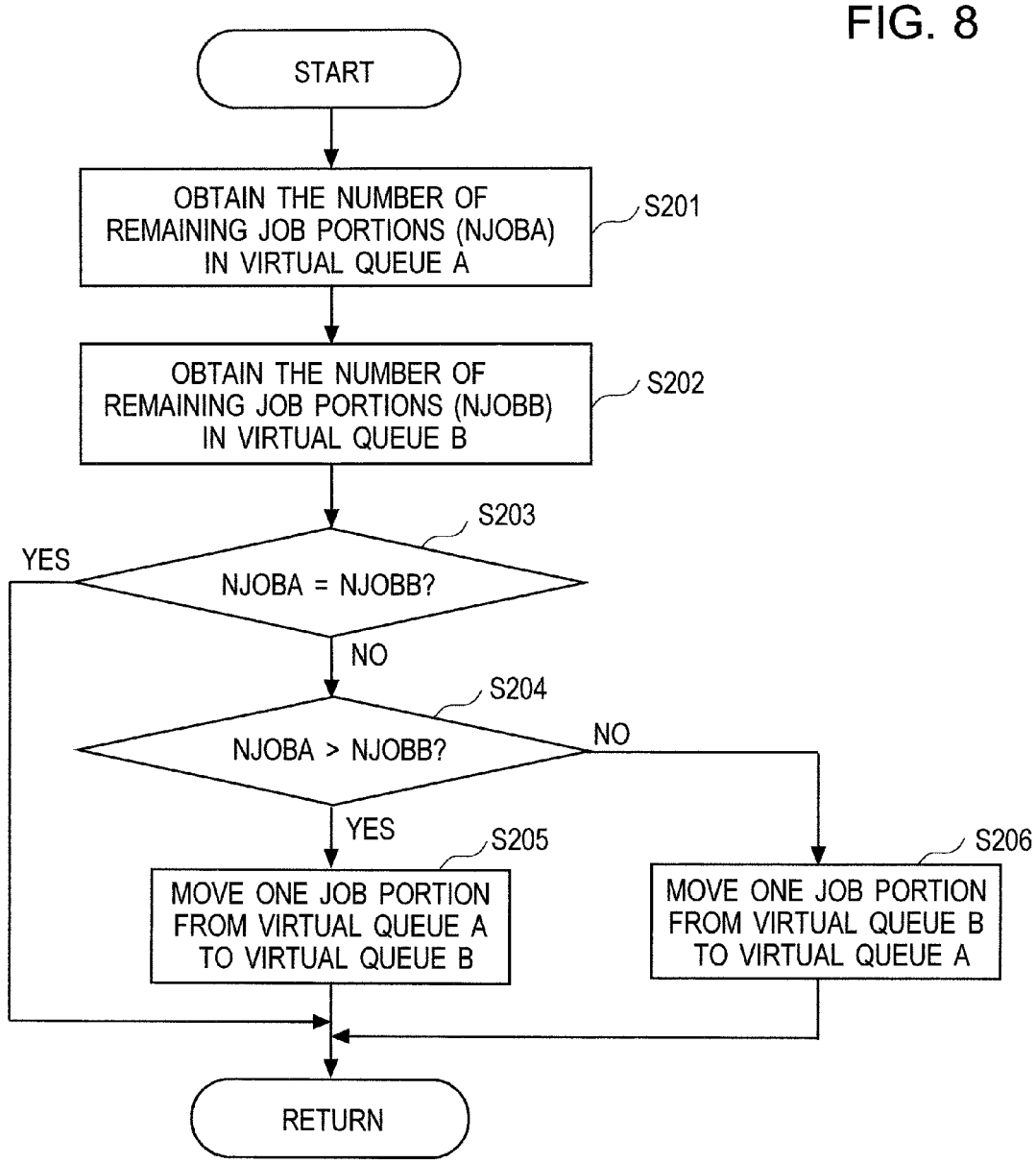
FIG. 8 is a flowchart illustrating an example of the operation (redistribution processing of job portions) of the distributed printing control apparatus according to Example 1.
Figure 9:
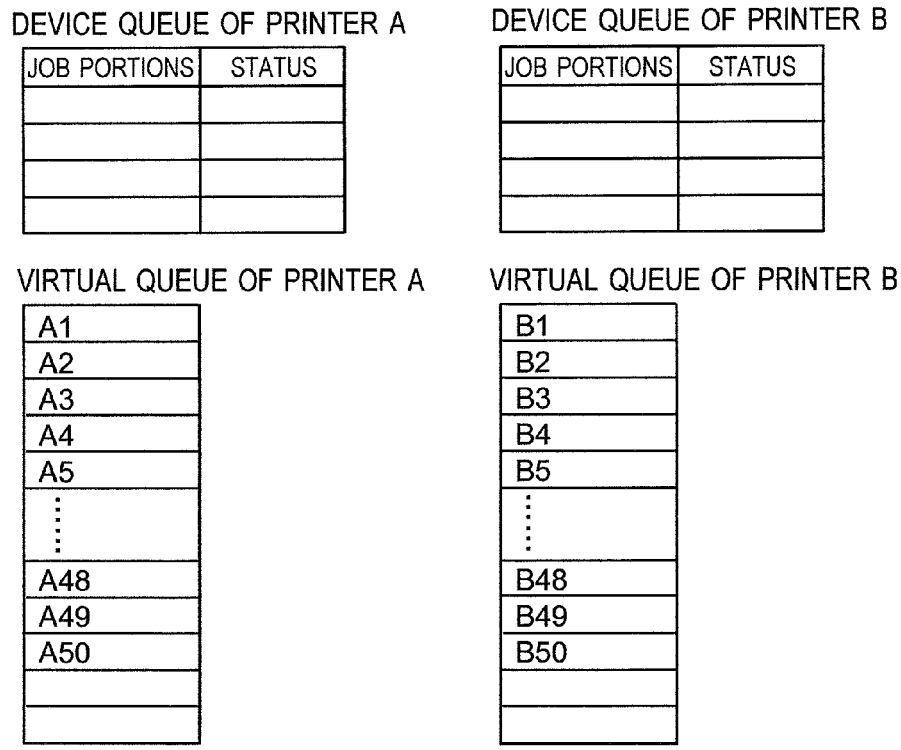
FIG. 9 is a diagram illustrating an example of management of the number of copies remaining to be printed of a print job (in an initial state) according to Example 1.
Figure 10:
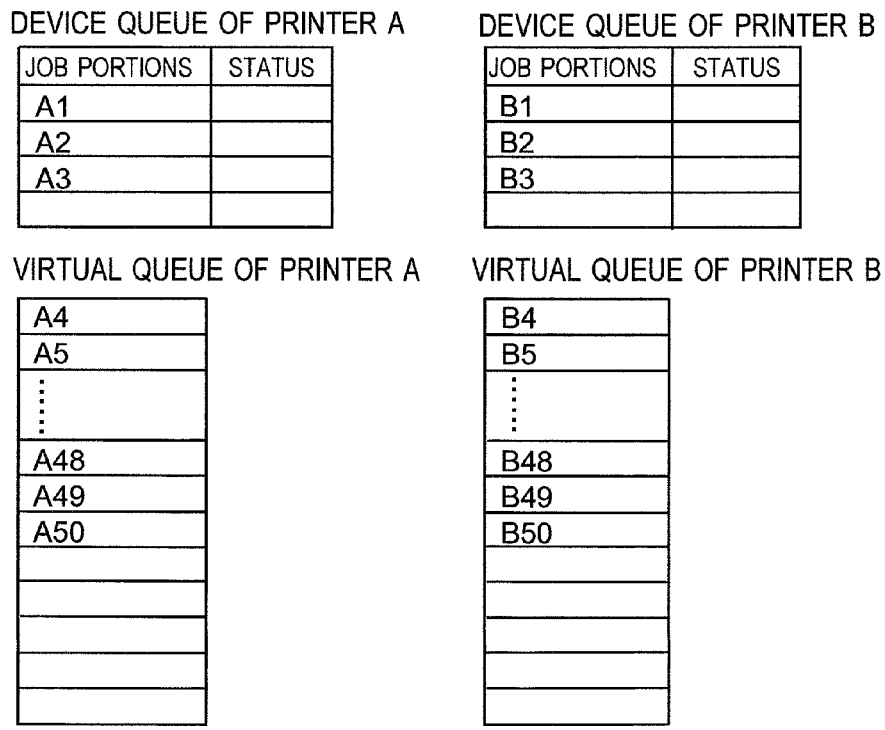
FIG. 10 is a diagram illustrating an example of management of the number of copies remaining to be printed of a print job (at a start of printing) according to Example 1.

In order to describe the above-mentioned embodiments of the present invention in more detail, description will be given to a non-transitory computer-readable storage medium storing a distributed printing control program, a distributed printing control apparatus, and a distributed printing control method according to the first example with reference to FIG. 1 to FIG. 14. FIG. 1 is a drawing schematically illustrating an example of the constitution of a distributed printing system according to Example 1. FIGS. 2A and 2B, FIGS. 3A and 3B, and FIG. 4 are block diagrams illustrating examples of the constitutions of a client terminal, a distributed printing control apparatus, and image forming apparatus, respectively. FIG. 5 and FIG. 6 each is a diagram for illustrating a problem relating to conventional distributed printing. FIG. 7 and FIG. 8 each is a flowchart illustrating an example of the processing of the distributed printing control apparatus according to Example 1. FIG. 9 through FIG. 11 are diagrams illustrating an example of management of the number of copies remaining to be printed of a print job. FIG. 12 through FIG. 14 are diagrams illustrating an example of management of the number of pages remaining to be printed of a print job.

A distributed printing system 10 of the present example is system which manages a plurality of image forming apparatuses 40 with a distributed printing control apparatus 30. In the system, one or more client terminals 20, the distributed printing control apparatus 30, and the plurality of image forming apparatuses 40, which can be connected to each other via a communication network 50, are arranged on an intranet. As one example, FIG. 1 illustrates the printing system 10 including image forming apparatuses 40a, 40b and so on, as the plurality of image forming apparatuses 40. As a standard of the communication network 50, Ethernet and other standards may be used. Hereinafter, description is given to each apparatus.

Figure 2A:
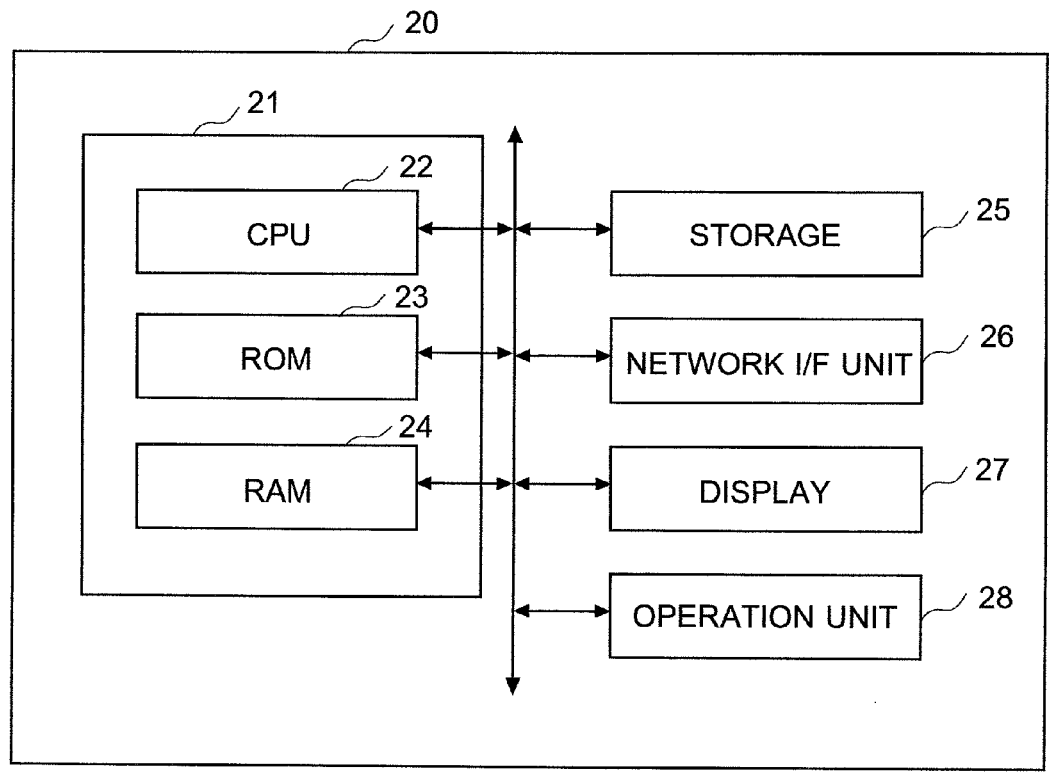
FIGS. 2A and 2B are block diagrams illustrating an example of the constitution of a client terminal according to Example 1.

Client Terminal:

The client terminal 20 is a computing device, such as a personal computer, that sends a print job to the distributed printing control apparatus 30. The client terminal 20 includes, as illustrated in FIG. 2A, a controller 21, a storage 25, a network interface (I/F) nit 26 and display 27 and operation unit 28.

Figure 2B:
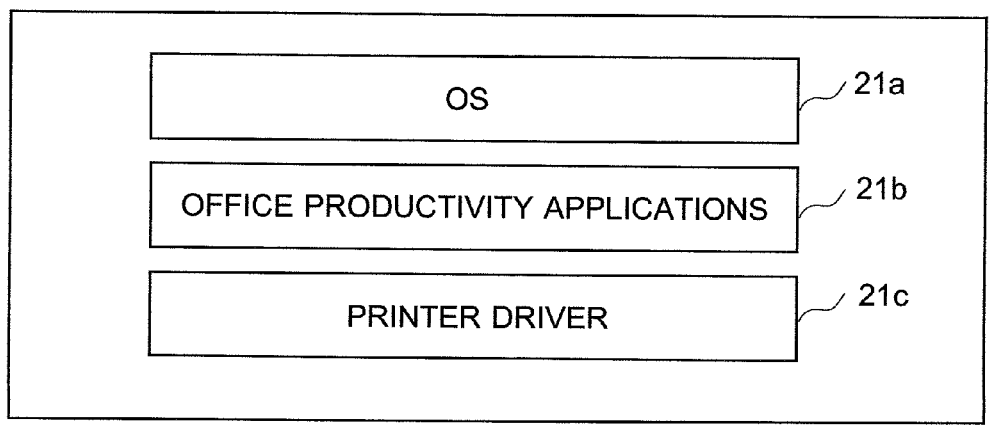

The controller 21 includes CPU (Central Processing Unit) 22, and memories including ROM (Read Only Memory) 23 and RAM (Random Access Memory) 24. CPU 22 reads out control programs stored in ROM 23 or storage 25, loads the programs onto RAM 24, and executes the programs, thereby performing the overall control of the client terminal 20. As illustrated in FIG. 2B, the controller 21 (CPU 22) executes OS (Operating System) 21a, office productivity applications 21b and printer driver 21c.

Examples of OS 21a include Windows, OS X and Android, where Windows is a registered trademark or trademark of Microsoft Corporation in the United States and/or other countries, OS X is a registered trademarks or trademark of Apple Inc. in the United States and/or other countries, and Android is a registered trademarks or trademark of Google Inc. in the United States and/or other countries. OS 21a manages application programs including office productivity applications 21b and printer driver 21c in the client terminal 20 so as to function and run the application programs.

The office productivity applications 21b are software programs including, for example, a word processor, a spreadsheet, and an image or photo editor. When sending print instructions, the office productivity applications 21b invoke the printer driver 21c and transfer document data created by the office productivity applications 21b to the printer driver 21c.

The printer driver 21c converts document data created by the office productivity application 21b into a print job in a language that image forming apparatuses 40 can interpret, where examples of the print job include PDL (Page Description Language) data written in a page description language, such as PJL (Printer Job Language), PS (PostScript) and PCL (Printer Control Language), and PDF (Portable Document Format) data. The printer driver 21e adds, into such a print job, print setting information set by a user on a print setting screen of the printer driver 21c.

The storage 25 is constituted by a memory, such as a HDD (Hard Disk Drive) and a SSD (Solid State Drive). The storage 25 stores programs which, when being executed, cause the CPU 22 to control various sections of the apparatus; information associated with the operations and functions of the apparatus; document data created by the office productivity applications 21b; print jobs created by the printer driver 21c; and others.

The network I/F unit 26 includes components, such as a NIC (Network Interface Card) and a modem. The network I/F unit 26 connects the client terminals 20 to the communication network 50 to send print jobs to the distributed printing control apparatus 30.

The display 27 includes a display unit such as a LCD (Liquid Crystal Display) and an organic EL (Electro-Luminescence) display, so as to display document creation screens of the office productivity applications 21b, a print setting screen of the printer driver 21c and other screens.

The operation unit 28 includes a device such as a mouse and a keyboard, and allows a user to perform various operations for creating a document by using the office productivity applications 21b and setting print conditions by using the printer driver 21c.

Distributed Printing Control Apparatus:

The distributed printing control apparatus 30 is a computing device like a server which sends, to the image forming apparatuses 40, job portions given by dividing a print job and instructions to perform distributed printing. As illustrated in FIG. 3A, the distributed printing control apparatus 30 includes a controller 31, a storage 35 and a network interface (I/F) unit 36, and optionally includes a display, an operation unit and so on. The distributed printing control apparatus 30 defines or registers the plurality of image forming apparatuses 40 as a group of image forming apparatuses on which a print job is to be processed and manages them in advance of distributed printing, and then sends instructions to perform distributed printing to the group of image forming apparatuses.

The controller 31 includes CPU 32, and memories including ROM 33 and RAM 34, CPU 32 reads out control programs stored in ROM 33 or storage 35, loads the programs onto RAM 34, and executes the programs, thereby performing the overall control of the distributed printing control apparatus 30. As illustrated in FIG. 3B, the controller 31 (CPU 32) is configured to work as a job dividing section 31a, a status monitoring section 31b and a job control section 31c.

The job dividing section 31a performs job dividing processing which divides a print job received from a client terminal 20 into plural job portions each sized in a certain print amount. For example, when receiving a print job which instructs the image forming apparatuses to print plural copies of a document, the job dividing section 31a divides the print job into plural job portions, which are groups of copies to be printed (referred to as copy clusters). For another example, when receiving a print job which instructs the image forming apparatuses to print plural pages of a document, the job dividing section 31a divides the print job into plural job portions, which are groups of pages to be printed (referred to as age clusters). It should be noted that the job portions may have an arbitrary file format and arbitrary structure, as far as each of the job portion can instruct to print a specific number of copies or pages, and that the job portions are not required to have the same file format or the same structure as that of the print job.

The status monitoring section 31b receives from each of the image forming apparatuses 40 a printing status indicating a status of job processing, monitors the status of job processing of each of the image forming apparatuses 40 on the basis of the printing status, and judges whether or not there is no job portion waiting to be processed in any of the image forming apparatuses 40. The status monitoring section 31b may be configured to receive the printing status which is sent from each of the image forming apparatuses 40 to the distributed printing control apparatus 30, or to obtain by the status monitoring section 31b itself the printing status of each of the image forming apparatuses 40 from MIB (Management Information Base) information.

The job control section 31c executes job distribution processing which distributes the job portions obtained by dividing a print job by the job dividing section 31a equally to the virtual queues prepared in the distributed printing control apparatus 30 so as to corresponding to the image forming apparatuses 40, respectively. Successively, the job control section 31c executes job instruction processing on an image forming apparatus 40 judged to have no waiting job portion by the status monitoring section 31b, where the job instruction processing is processing to dequeue one job portion from the virtual queue corresponding to the image forming apparatus 40 judged and send the job portion to the image forming apparatus 40 judged. That is, the job control section 31c successively sends job portions to each of the image forming apparatuses 40 from the corresponding virtual queue so that each of the image forming apparatuses 40 has one job portion waiting to be processed usually during the job processing. The job control section 31c further performs job-redistributing processing at specific times (for example, at a time when a job portion is sent to any of the image forming apparatuses 40 from the corresponding virtual queue, or at certain intervals of time), where the job-redistributing processing includes obtaining the number of job portions queued in each virtual queue (the number of remaining job portions in each virtual queue) and moving one or more job portions from one from another of the virtual queues so as to keep the numbers of remaining jobs in the virtual queues equal to each other.

Herein, the above-mentioned job dividing section 31a, status monitoring section 31b and job control section 31c may be constituted as hardware devices. Alternatively, the above-mentioned job dividing section 31a, status monitoring section 31b and job control section 31c may be provided by a distributed printing control program which causes the controller 31 to function as these sections when being executed by CPU 32. That is, the controller 31 may be configured to serve as the job dividing section 31a, status monitoring section 31b and job control section 31c, when CPU 32 executes the distributed printing control program.

The storage 35 is constituted by a memory, such as a HDD and a SSD. The storage 35 stores programs which, when being executed, cause the CPU 32 to control various sections of the apparatus; print jobs received from a client terminal 20; and others. In the storage 35, there are prepared virtual queues 35a for respective image forming apparatuses 40, and job portions are stored into the virtual queues 35a in accordance with instructions given from the job control section 31c. Each virtual queue 35a is realized by a buffer of entities of a queue and a controller, and is configured to pool print instruction data (job portions) to be in a first-in-first-out data structure. The job portions queued in a virtual queue 35a are sequentially output (that is, dequeued and sent) to device queue of the corresponding image forming apparatus 40 in the policy such that the first to have been added to the queue is the first to be output from the queue.

The network I/F unit 36 includes components, such as a NIC (Network Interface Card) and a modem. The network I/F unit 36 connects the distributed printing control apparatus 30 to the communication network 50 to receive print jobs from a client terminal 20, receive a print status from an image forming apparatus 40 or send job portions to an image forming apparatuses 40.

Image Forming Apparatus:

The image forming apparatus 40 is an apparatus configured to execute print processing by using job portions received from the distributed printing control apparatus 30. Examples of the image forming apparatus 40 include a multi-functional peripheral or MFP (sometime called as a printer in the present example). It is assumed that all the plural image forming apparatuses 40 in the distributed printing system 10 are capable of printing on the same type of paper and of processing job portions similarly, though optional components and processing capacities of them are not uniform. The plural image forming apparatuses 40 in the distributed printing system 10 can be divided into and managed as groups. The image forming apparatuses 40 belonging to the same group may be defined as targets of distributed printing control of the present example. Each image forming apparatus 40 includes, as illustrated in FIG. 4, a controller 41, a storage 45, a network interface (I/F) unit 46, display and operation unit 47, an image processor 48 and print processor 49.

The controller 41 includes CPU 42, and memories including ROM 43 and RAM 44. CPU 42 reads out control programs stored in ROM 43 or storage 45, loads the programs onto RAM 44, and executes the programs, thereby performing the overall control of the image forming apparatus 40.

The storage 45 is constituted by a memory, such as a HDD and a SSD. The storage 35 stores programs which, when being executed, cause the CPU 42 to control various sections of the apparatus; information associated with the operations and functions of the apparatus; and others. In the storage 45, there are prepared device queue 45a, and job portions received from the distributed printing control apparatus 30 are stored into the device queues 45a in accordance with instructions given from the controller 41. The device queue 45a is also realized by a buffer of entities of a queue and a controller, and is configured to pool print instruction data (job portions) to be in a first-in-first-out data structure. The job portions queued in the device queue 45a are sequentially dequeued and processed by the image processor 48 and the print processor 49 in the policy such that the first to have been added to the queue is the first to be output from the queue and processed.

The network I/F unit 46 includes components, such as a NIC and a modem. The network I/F unit 36 connects the image forming apparatus 40 to the communication network 50 to receive print jobs from the distributed printing control apparatus 30 or send a printing status to the distributed printing control apparatus 30.

The display and operation unit 47 is configured to display various screens relating to print processing and allows a user to perform various operations relating to printing on the screens. Examples of the display and operation unit 47 include a touch screen in which a pressure-sensitive operation unit (a touch sensor) composed of lattice-shaped transparent electrodes is arranged on a display unit.

The image processor 48 works as a RIP (raster image processor) unit. The image processor 48 interprets a job portion to create intermediate data, and executes rendering processing to generate a raster image data or bitmap image data (these processes are referred to as raster image processing). The image processor 48 further performs, if needed, screening, tone correction, image density balance adjustment, thinning, halftone dotting processing, etc. on the image data. The image processor 48 the outputs the resulting bitmap image data to print processor 49.

Print processor 49 is configured to perform print processing on the basis of the bitmap image data. The print processor 49 includes an exposure unit, an image forming unit, an intermediate transfer belt, a secondary transfer roller, a fixing unit and a conveying section. The exposure unit is configured to irradiate a photoreceptor drum with a laser beam in accordance with bitmap image data, to perform exposure processing. The image forming unit is configured to form a toner image in each color of C, M, Y, and K, and includes photoreceptor drums, developing units, charging units, photoreceptor cleaning units, and primary transfer rollers. The intermediate transfer belt is rotated by rollers and functions as an intermediate transfer body to convey toner images formed by the photoreceptor unit to a sheet of paper. The secondary transfer roller transfers toner images formed on the intermediate transfer belt onto a sheet of paper. The fixing unit fixes toner images transferred onto a sheet of paper. The conveying section includes a sheet feeding roller, a registration roller, a loop roller, a reversing roller, and a sheet ejecting roller, and the like.

It should be noted that FIGS. 1 to 4 are given by way of illustration only, and the constitution and control of each given apparatus can be modified appropriately as far as the modified apparatuses can realize the distributed printing control of the present example.

Hereinafter, description is given to a control method of distributed printing to be executed in the distributed printing system 10 with the above constitution. First, the distributed printing control of the present example is described by using conventional distributed printing control.

FIG. 5 illustrates an example of job control in the distributed printing such that a print job to produce 100 copies of printed matter is divided and processed on a printer A and printer B as two image forming apparatuses. Conventionally, distributed printing has been performed by dividing a print job into job portion A and job portion B each to print 50 copies and by distributing the job portion A and the job portion B to the printer A and the printer B, respectively. In this distributed printing, if the processing capacities of the printers A and B are equal to each other, the printers A and B finish their job processing at the same time. On the other hand, if the processing capacity of the printer A is 100 ppm (page per minutes) and the processing capacity of the printer is 200 ppm, i.e., the processing capacity of the printer it is higher than that of the printer A, the printer A cannot complete the output of the job portion A at the time when the printer B completes the output of job portion B. As a result, waiting time corresponding to the number of copies remaining to be printed (in this case, 25 copies) occurs as illustrated in FIG. 5.

FIG. 6 illustrates an example of control in the distributed printing such that a print job to produce printed matter containing 1000 pages is processed on a printer A and printer B as two image forming apparatuses, by being divided and distributed to the printer A and the printer B. Conventionally, distributed printing has been performed by dividing a print job into job portion A to print from the first page to the 500th page and job portion B to print from the 501th page to the last page and by distributing the job portion A and the job portion B to the printer A and the printer B, respectively. In this distributed printing, if the processing capacities of the printers A and B are equal to each other, the printers A and B finish their job processing at the same time. If some trouble (for example, out of paper, a paper jam, etc.) arises in one of the image forming apparatuses (the printer A in this case), the trouble interrupts processing of the job portion A distributed to the printer A. As a result, the printer A cannot complete the output of the job portion A at the time when the printer B completes the output of job portion B, and waiting time corresponding to the number of pages remaining to be printed (in this case, 200 pages) occurs as illustrated in FIG. 6.

In this way, conventional distributed printing includes the processes of dividing a print job into equal portions and sending the equal portions separately to image forming apparatuses before job processing. In such distributed printing, the finishing times of job processing of the image forming apparatuses cannot be coincide with each other under the condition that there is a difference between the processing capacities of the image forming apparatuses, or the condition that some trouble has arisen in any one of the image forming apparatuses. It can cause the issue that finishing operations of printed matter and processing of the next print job are prevented from being instantly performed.

In view of that, for example, it may be possible to adjust the amounts of job portions to be distrusted to the respective image forming apparatus in proportion to the processing capacities of the image forming apparatuses (to distribute the greater amount of job portion to the image forming apparatus with the higher processing capacity) in advance of job processing. However, even with this method, the image forming apparatuses would not finish their job processing at the same time under a condition that any trouble arises in one of the image forming apparatuses. Further, consideration may be also given to a method including, at a time point when it turns out that the image forming apparatuses will not finish their job processing at the same time, sending a job portion from an image forming apparatus in which the job processing is progressing less than the others to an image forming apparatus in which the job processing is progressing more than the others. However, with this method, since it is necessary to resend a job portion which has been sent once, useless communication arises and it makes efficient job processing of the image forming apparatuses difficult.

In view of that, the present example provides the distributed printing system performing the following job control in distributed printing, rather than sending or distributing all the job portions given by dividing a print job to image forming apparatuses 40 in advance of execution of job processing. In the system, there are provided virtual queues 35a for respective image forming apparatuses 40 in the distributed printing control apparatus 30, and job portions are distributed to the virtual queues 35a equally. Then, the distributed printing control apparatus 30 sends sequentially the job portions (sends necessary minimum job portion or portions at each time) to each of the image forming apparatuses 40 from the corresponding virtual queue 35a while monitoring the status of processing of each of the image forming apparatuses 40. The distributed printing control apparatus 30 further moves one or more job portions among the virtual queues 35a so as to keep the numbers of job portions remaining or queued in the virtual queues 35a equal to each other.

Hereinafter, detailed description is given to the operations of the distributed printing control apparatus 30 performing the above job control of the distributed printing. The CPU 32 loads the distributed printing control program stored in the ROM 33 or storage 35 onto the RAM 34 and executes the program, thereby executing processing of the steps of the flowcharts illustrated in FIGS. 7 and 8.

As illustrated in FIG. 7, when the distributed printing control apparatus 30 receives a print job from a client terminal 20, the controller 31 (the job dividing section 31a) divides the print job into plural job portions according to copies or pages to be printed (job portions each including a specific number of copies or pages to be printed) (S101). Then, the controller 31 (the job control section 31c) distributes the job portions equally to the virtual queues 35a prepared for the respective image forming apparatuses 40 (S102), and sends a certain number (necessary minimum) of job portions to each of the image forming apparatuses 40 from a corresponding one of the virtual queues 35a (S103).

Next, the controller 31 (the status monitoring section 31b) obtains a status of printing from each of the image forming apparatuses 40 (S104), and judges based on the status of printing whether there is an image forming apparatus 40 in which no waiting job portion remains (S105). When finding an image forming apparatus 40 in which no waiting job portion remains, the controller 31 (the job control section 31c) sends one job portion to the image forming apparatus 40 from the corresponding virtual queue 35a (S106). That is, the controller 31 (the job control section 31c) sends job portions successively to each of the image forming apparatuses 40 from the corresponding virtual queue 35a so that the number of waiting job portion remaining in each of the image forming apparatuses 40 is kept to be one.

Further, the controller 31 executes redistribution of job portions at specific times (for example, at a time when a job portion has been sent from the virtual queue 35a or at predetermined intervals) (S107). Thereafter, the controller 31 (the job control section 31c) checks whether there is a job portion remaining in any of the virtual queues 35a (S108). When finding a job portion remaining in the virtual queues 35a, the processing returns to S104, and the same processing is repeated. When there is no remaining job portion, a series of job processing is ended.

FIG. 8 illustrates the details of the redistribution processing of job portions at the above step S107. Hereafter, in order to make the description easier, it is supposed that job portions are distributed to two virtual queues (virtual queues A and B) corresponding to two image forming apparatuses 40 (printers A and B).

First, the controller 31 (the job control section 31c) obtains the number of job portions (NJOBA in FIG. 8) remaining in the virtual queue A (S201), and successively, obtains the number of job portions (NJOBB in FIG. 8) remaining in the virtual queue B (S202). Next, the controller 31 (the job control section 31c) compares the number of job portion remaining in the virtual queue A with the number of job portions remaining in the virtual queue B. If both the numbers (NJOBA and NJOBB in FIG. 8) are equal to each other (Yes at S203), since there is no need to execute redistribution of job portions, the processing of this flow is ended.

On the other hand, if both the numbers (NJOBA and NJOBB in FIG. 8) are not equal to each other (No at S203), the controller 31 (the job control section 31c) judges whether the number of job portions remaining in the virtual queue A is greater than the number of job portions remaining in the virtual queue B (S204). If the number of job portions remaining in the virtual queue A is greater than the number of job portions remaining in the virtual queue B, the controller 31 moves one job portion from the virtual queue A to the virtual queue B (S205). If the number of job portions remaining in the virtual queue A is less than the number of job portions remaining in the virtual queue B, the controller 31 moves one job portion from the virtual queue B to the virtual queue A (S206).

In this way, the control of distributed printing in the present example includes distributing job portions equally to plural virtual queues beforehand, sending the job portions sequentially to each of the image forming apparatus when no waiting job portion remains in the image forming apparatus, from the corresponding virtual queue, and performing the redistribution of job portions to the virtual queues. With such the control, the distributed printing control apparatus can keep the numbers of job portions remaining in the virtual queues equal to each other even under a condition that the image forming apparatuses 40 are not same in processing capacity or a condition that some trouble arises in one of the image forming apparatuses 40. Therefore, it can coincide the finishing times of job processing of the plural image forming apparatuses 40 with each other, which allows the subsequent finishing operations of printed matter and the next print job to be advanced without delay, and realizes efficient processing of print jobs.

Hereinafter, description is given to distribution and redistribution of job portions to virtual queues by showing concrete examples. Hereafter, it is supposed that distributed printing is performed on two printers of a printer A with a processing capacity of 100 ppm and a printer B with a processing capacity of 200 ppm. In FIG. 9 to FIG. 14, the left half illustrates the processing of job portions of the printer A, the right half illustrates the processing of job portions of the printer B, the two tables in the upper half illustrate the device queues 45a of the printers A and B, respectively, and the two tables in the bottom half illustrate the virtual queues 35a prepared in the distributed printing control apparatus 30 for the printers A and B, respectively.

To print 100 copies of a document which contains 100 pages, in conventional distributed printing, the number of copies were simply divided equally and instructions to print 50 copies of the document were sent to each of the two printers A and B (a print job portion to instruct to print 50 copies of the document was sent to the device queue 50a of each of the printers A and B). On the other hand, to print 100 copies of the document, the controller 31 of the distributed printing control apparatus 30 of the present example, as illustrated in FIG. 9, divides a print job containing 100 copies to be printed, into 100 job portions each containing one copy to be printed (job portions A1 to A50 and job portions B1 to B50) and distributes the 100 job portions to the virtual queues 35a of the printer A and the printer B equally. It should be noted that the number of copies contained in each job portion may be defined arbitrarily, but it is preferable that if the processing capacities of the printers are different, a print job is divided such that each job portion contains the number of copies that can be printed per unit time by the printer having the lowest processing capacity.

Then, as illustrated in FIG. 10, the controller 31 of the distributed printing control apparatus 30 sends, to each of the printers A and B, a specific number of job portions (a minimum necessary number of job portions such that each printer can perform their print processing continuously, three job portions in the example of FIG. 10) from the corresponding virtual queue 35a, and starts the print processing of each of the printers A and B. Since there is a difference between the processing capacities of the printers A and B (the processing capacity of the printer B is higher than that of the printer A), the number of copies remaining in the virtual queue 35a of the printer B decreases earlier than that in the virtual queue 35a of the printer A. The controller 31 of the distributed printing control apparatus 30 checks the number of job portions remaining in each virtual queue 35a at specific times (for example, at time when a job portion or portions have been sent from the virtual queue 35a or at time when a prescribed period of time determined beforehand has elapsed), and when finding that a difference between the numbers is caused, moves one or more job portions from one of the virtual queues 35a to the other so as to keep the numbers of copies (the number of job portions) remaining in the virtual queues 35a equal to each other.

For example, in this case, the printer A and the printer B finish 2 copies and 4 copies, respectively within two minutes, and after two minutes have elapsed the numbers of remaining copies in the virtual queues 35a of the printer A and the printer B become 46 copies and 44 copies, respectively. The controller 31 of the distributed printing control apparatus 30, as illustrated in FIG. 11, moves one job portion from the virtual queue 35a of the printer A to the virtual queue 35a of the printer B (in FIG. 11, the job portion A50 is moved), to keep the numbers of remaining copies (the number of job portions) in virtual queues 35a equal to each other. With this, the printers A and B finish the job processing at almost the same time.

In another case to perform distributed printing on two printers of printers A and B by using a print job to print a document containing 2000 pages, in conventional distributed printing, the number of pages were simply divided into two equal portions and one of the printers was instructed to print the first to 1000th pages and the other was instructed to print the 1001th to 2000th pages. On the other hand, the controller 31 of the distributed printing control apparatus 30 of the present example, as illustrated in FIG. 12, divides the 2000 pages into 20 job portions each containing a specific number of pages to be printed (100 pages in this case) and distributes the 20 job portions to the virtual queues 35a of the printer A and the printer B equally. At that time, the controller 31 of the distributed printing control apparatus 30 distributes the first to 1000th pages to the virtual queue 35a of the printer A so as to be processed in this order (namely, in the ascending order), and distributes the last to 1001th pages to the virtual queue 35a of the printer B so as to be processed in this order (namely, in the descending order). The reason why the order of pages contained in the job portions queued in one of the virtual queues 35a is opposite to that in the other is that the printers A and B can print the pages in correct order even after one or more job portions are moved between the virtual queues. The controller 31 of the distributed printing control apparatus 30 further gives instructions to the printer A to perform face-down output of the printed pages (to output printed pages with the printed sides facing down and stack up them one by one) and gives instructions to the printer to perform face-up output of the printed pages (to output printed pages with the printed sides facing up and stack up them one by one). It should be noted that the number of pages contained in each job portion may be defined arbitrarily, but it is preferable that if the processing capacities of the printers are different, a print job is divided such that each job portion contains the number of pages that can be printed per unit time by the printer having the minimum processing capacity.

Then, as illustrated in FIG. 13, the controller 31 of the distributed printing control apparatus 30 sends, to each of the printers A and B, a specific number of job portions (a minimum necessary number of job portions such that each printer can perform their print processing continuously, three job portions in the example of FIG. 13) from the corresponding virtual queue 35a, and starts the print processing of each of the printers A and B. Since there is a difference between the processing capacities of the printers A and B (the processing capacity of the printer B is higher than that of the printer A), the number of pages remaining in the virtual queue 35a of the printer decreases earlier than that of the virtual queue 35a of the printer A, but when the job processing of the printer B is assumed to be suspended due to, for example, a trouble which arises in the printer B the number of pages remaining in the virtual queue 35a of the printer A decreases earlier than that of the virtual queue 35a of the printer B. The controller 31 of the distributed printing control apparatus 30 checks the number of job portions remaining in each virtual queue 35a at specific times (for example, at time hen a job portion or portions have been sent from the virtual queue 35a or at time when a prescribed period of time determined beforehand has elapsed), and when finding that a difference of the numbers is caused, moves one or more job portions from one of the virtual queues 35a to the other so as to keep the numbers of pages (the number of job portions) remaining in the virtual queues 35a equal to each other. In this process, it is preferable that the controller 31 of the distributed printing control apparatus 30 moves one or more job portions at the end of one of the virtual queues 35a to the end of the other of the virtual queues 35a.

For example, under a condition that the printer B is out of paper, the printer A continues its print processing. As the suspension time period of the printer B becomes longer, the difference between the numbers of pages remaining to be printed in the virtual queues 35a becomes greater. Therefore, as illustrated in FIG. 14, the controller 31 of the distributed printing control apparatus 30 moves one job portion from the virtual queue 35a of the printer B to the virtual queue 35a of the printer A (in FIG. 14, reverses the order of pages in the job portion containing the 1100th to 1001th pages at the end of the virtual queue 35 of printer B, and moves the job portion containing the 1001th to 1100th pages to the end of the virtual queue 35 of printer A) to keep the numbers of pages (the number of job portions) remaining in the virtual queues 35a equal to each other. With this, the printers A and B finish the job processing at almost the same time.

Example 2

Figure 15:
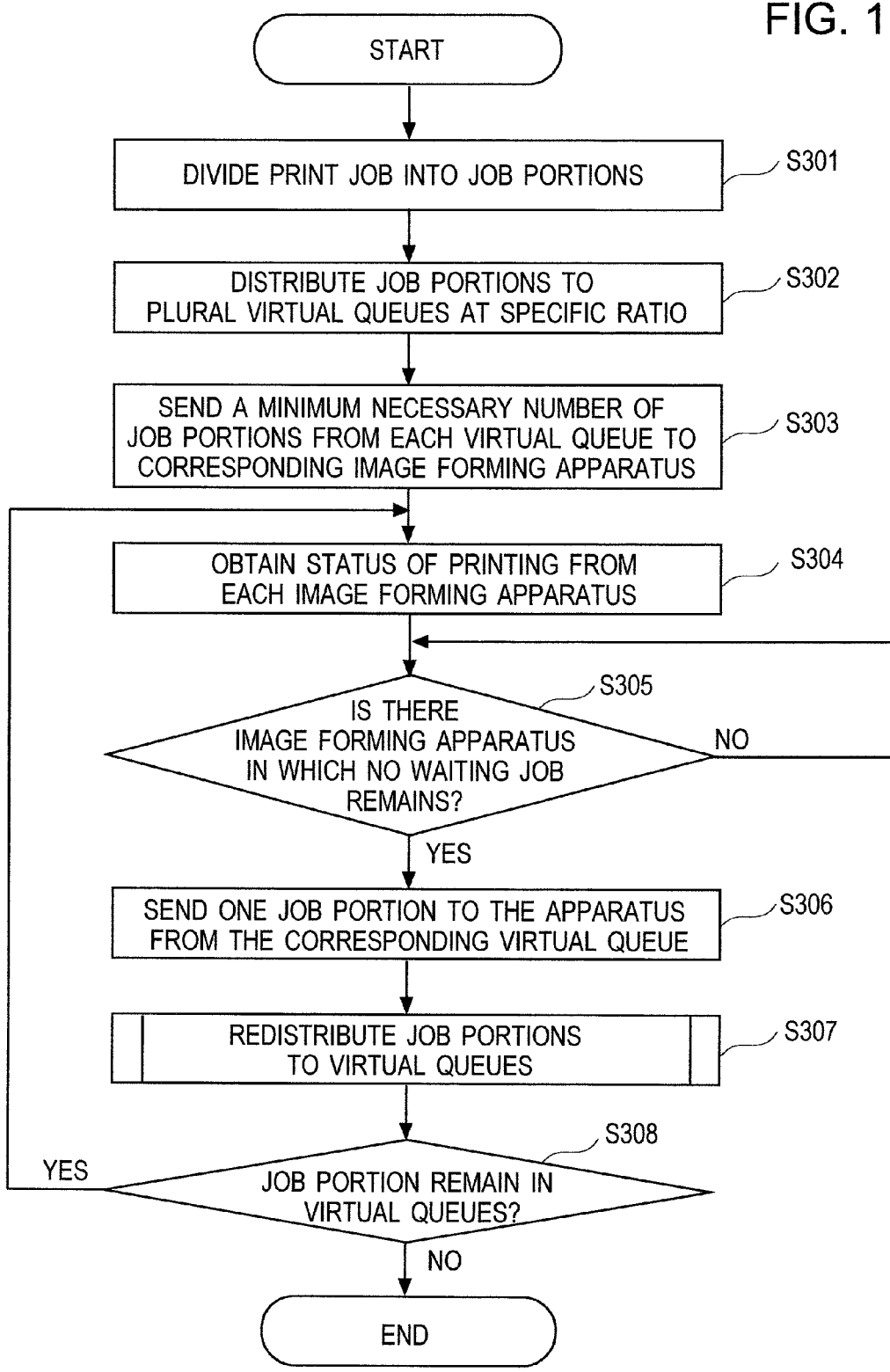
FIG. 15 is a flowchart illustrating an example of the operation of the distributed printing control apparatus according to Example 2.
Figure 16:
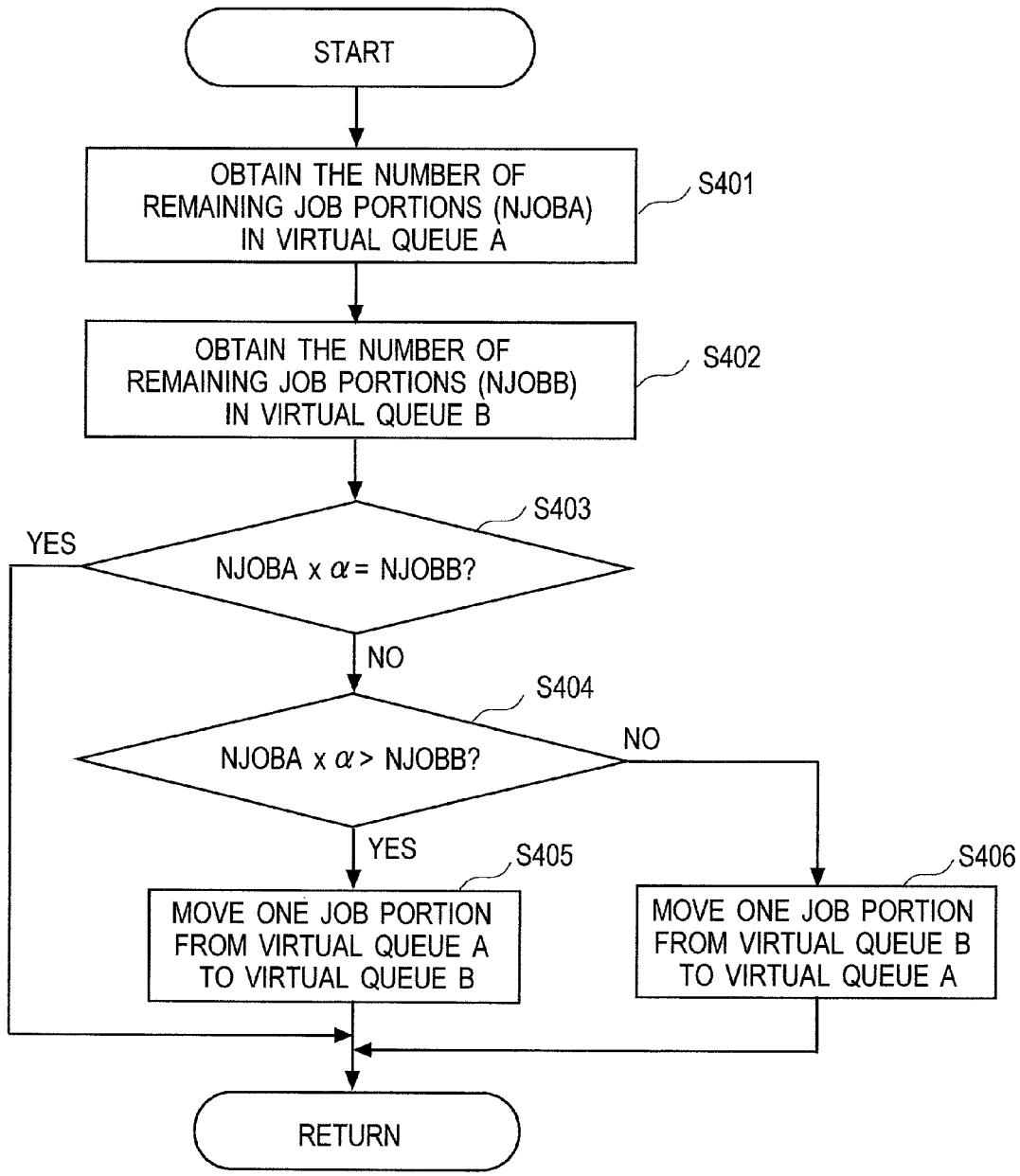
FIG. 16 is a flowchart illustrating an example of the operation (redistribution processing of job portions) of the distributed printing control apparatus according to Example 2.

Next, description will be given to a non-transitory computer-readable storage medium storing a distributed printing control program, a distributed printing control apparatus, and a distributed printing control method according to the second example with reference to FIG. 15 to FIG. 20. FIG. 15 and FIG. 16 each is a flowchart illustrating an example of the processing of a distributed printing control apparatus of the present example. FIG. 17 and FIG. 18 each is a diagram illustrating an example of management of the number of copies remaining to be printed of a print job. FIG. 19 and FIG. 20 each is a diagram illustrating an example of management of the number of pages remaining to be printed of a print job.

In Example 1, job portions were distributed equally to a plurality of virtual queues 35a. Under a condition that there is a difference among the processing capacities of a plurality of image forming apparatuses 40, it is possible to reduce the movement of job portions among the virtual queues by distributing job portions to the virtual queues 35a according to the processing capacities of the image forming apparatuses 40. To perform such the distributed printing, the distributed printing system 10 may have the same construction as that illustrated in FIG. 1 to FIG. 4 in Example 1, but causes the distributed printing control apparatus 30 to perform the following processing. That is, the job control section 31c of the controller 31 of the distributed printing control apparatus 30 distributes job portions, which were given by dividing a print job with the job dividing section 31a, to the virtual queues 35a prepared in the distributed printing control apparatus 30 for the respective image forming apparatuses 40, at specific ratio according to the processing capacities of the image forming apparatuses 40. Then, the job control section 31c further performs the following processing at appropriate times (for example, at a time when a job portion is sent to any of the image forming apparatuses 40 from the corresponding virtual queue, or at certain intervals of time), where the processing includes obtaining the number of job portions queued in each virtual queue (the number of remaining job portions in each virtual queue) and moving one or more job portions from one from another of the virtual queues so as to keep the numbers of remaining jobs in the virtual queues in a specific ratio.

Hereinafter, description is given to the operations of the distributed printing control apparatus 30 performing the above job control of the distributed printing. The CPU 32 loads the distributed printing control program stored in the ROM 33 or storage 35 onto the RAM 34 and executes the program, thereby executing processing of the steps of the flowcharts illustrated in FIGS. 15 and 16.

As illustrated in FIG. 15, when the distributed printing control apparatus 30 receives a print job from a client terminal 20, the controller 31 (the job dividing section 31a) divides the print job into plural job portions according to copies or pages to be printed (job portions each including a specific number of copies or pages to be printed) (S301). Then, the controller 31 (the job control section 31c) distributes the job portions to the virtual queues 35a prepared for the respective image forming apparatuses 40 at a specific ratio according to the processing capacities of the image forming apparatuses 40 (S302), and sends a specific number (necessary minimum) of job portions to each of the image forming apparatuses 40 from a corresponding one of the virtual queues 35a (S303).

Next, the controller 31 (the status monitoring section 31b) obtains a status of printing from each of the image forming apparatuses 40 (S304), and judges based on the status of printing whether there is an image forming apparatus 40 in which no waiting job portion remains (S305). When finding an image forming apparatus 40 in which no waiting job portion remains, the controller 31 (the job control section 31c) sends one job portion to the image forming apparatus 40 from the corresponding virtual queue 35a (S306). That is, the controller 31 (the job control section 31c) sends job portions successively to each of the image forming apparatuses 40 from the corresponding virtual queue 35a so that the number of waiting job portion remaining in each of the image forming apparatuses 40 is kept to be one.

Further, the controller 31 executes redistribution of job portions at specific times (for example, at a time when a job portion has been sent from the virtual queue 35a or at predetermined intervals) (S307). Thereafter, the controller 31 (the job control section 31c) checks whether there is a job portion remaining in any of the virtual queues 35a (S308). When finding a job portion remaining in the virtual queues 35a, the processing returns to S304, and the same processing is repeated. When there is no remaining job portion, a series of job processing is ended.

FIG. 16 illustrates the details of the redistribution processing of job portions at the above step S307. Hereafter, in order to make the description easier, it is supposed that job portions are distributed to two virtual queues (virtual queue A and B) corresponding to two image forming apparatuses 40 (printers A and B) and that the processing capacity of the printer A is a times the processing capacity of the printer B.

First, the controller 31 (the job control section 31c) obtains the number of job portions (NJOBA in FIG. 16) remaining in the virtual queue A (S401), and successively, obtains the number of job portions (NJOBB in FIG. 16) remaining in the virtual queue B (S402). Next, the controller 31 (the job control section 31c) compares the number of remaining job portion in the virtual queue A multiplied by $\alpha$ (NJOBA×$\alpha$) with the number of remaining job portions in the virtual queue B. If both the numbers (NJOBA×$\alpha$ and NJOBB in FIG. 16) are equal to each other (Yes at S403), since there is no need to execute redistribution of job portions, the processing of this flow is ended.

On the other hand, if both the numbers (NJOBA×$\alpha$ and NJOBB in FIG. 16) are not equal to each other (No at S403), the controller 31 (the job control section 31c) judges whether the number of remaining job portions in the virtual queue A multiplied by $\alpha$ (NJOBA×$\alpha$) is greater than the number of remaining job portions in the virtual queue B (NJOBB) (S404). If the number NJOBA×$\alpha$ is greater than the number NJOBB, the controller 31 moves one job portion from the virtual queue A to the virtual queue B (S405). If the number NJOBA×$\alpha$ is less than the number NJOBB, the controller 31 moves one job portion from the virtual queue B to the virtual queue A (S406).

In this way, the distributed print control in the present example includes distributing job portions to plural virtual queues at the specific ratio according to the processing capacities of the image forming apparatuses 40 beforehand, sending the job portions sequentially to each of the image forming apparatus when no waiting job portion remains in the image forming apparatus, from the corresponding virtual queue, and performing the redistributing of the job portions to the virtual queues. With such the control, the distributed printing control apparatus can keep the numbers of job portions remaining in the virtual queues in the specific ratio eve under a condition that the image forming apparatuses 40 are not same in processing capacity or a condition that some trouble arises in one of the image firming apparatuses 40. Therefore, it can coincide the finishing times of job processing of the plural image forming apparatuses 40 with each other with the reduced amount of movement of job portions among the virtual queues in comparison with Example 1, which allows the subsequent finishing operations of printed matter and the next print job to be advanced without delay, and realizes efficient processing of print jobs.

Hereinafter, description is given to distribution and redistribution of job portions to virtual queues by showing concrete examples. Hereafter, it is supposed that distributed printing is performed on two printers of a printer A with a processing capacity of 100 ppm and a printer B with a processing capacity of 200 ppm. In FIG. 17 to FIG. 20, the left half illustrates the processing of job portions in the printer A, the right half illustrates the processing of job portions in the printer B, the two tables in the upper half illustrate the device queues 45a of the printers A and B, respectively, and the two tables in the bottom half illustrate the virtual queues 35a prepared in the distributed printing control apparatus 30 for the printers A and B, respectively.

To print 60 copies of a document which contains 100 pages, the controller 31 of the distributed printing control apparatus 30 of the present example, as illustrated in FIG. 17, divides a print job containing 60 copies to be printed, into 60 job portions each containing one copy to be printed (job portions A1 to A20 and job portions B1 to B40) and distributes the 60 job portions to the virtual queues 35a of the printer A and the printer B at the specific ratio according to the processing capacities of the printers A and B. Herein, since the processing capacity of the printer B is two times the processing capacity of the printer A, the controller 31 of the distributed printing control apparatus 30 distributes, to the virtual queue 35a of the printer B, the job portions being two times the job portions distributed to the virtual queue 35a of the printer A.

Then, the controller 31 of the distributed printing control apparatus 30 sends, to each of the printers A and B, a specific number of job portions from the corresponding virtual queue 35a, and starts the print processing of each of the printers A and B. Since job portions were distributed to the virtual queues 35a at the specific ratio according to the processing capacities of the printers A and B, the numbers of copies remaining to be printed in the virtual queues 35a of the printers A and B decrease with keeping the specific ratio. For example, as illustrated in FIG. 18, in this case, the printer A and printer B finish 14 copies and 28 copies, respectively within fourteen minutes, and after fourteen minutes have elapsed the numbers of job portions in processing and job portions remaining to be processed in the printer A becomes 6 copies in total (the job portion A15 in processing, the job portion A16 in transferring and the job portions A17 to A20 remaining in the virtual queue 35a) and the numbers of job portions in processing and job portions remaining to be processed in the printer B becomes 12 copies in total (the job portion B29 in processing, the job portion B30 in transferring and the job portions B31 to B40 remaining in the virtual queue 35a). Since the processing capacity of the printer B is approximately two times the processing capacity of the printer A, the inters A and B finish the job processing at almost the same time. Accordingly, it becomes possible to eliminate the movement of job portions jobs between the virtual queues 35a.

Under a condition that some trouble arises in one of the printers, the controller 31 of the distributed printing control apparatus 30 may check the number of job portions remaining in each virtual queue 35a at specific times (for example, at time when a job portion or portions have been sent from the virtual queue 35a or at time when a prescribed period of time determined beforehand has elapsed), and move one or more job portions from one of the virtual queues 35a to the other so as to keep the numbers of copies remaining to be printed (each is preferably the total number of copies in processing and copies in transferring and copies remaining in the virtual queues, in order to accurately coincide the finishing times of job processing of the printers), in other words, the numbers of job portions remaining in the virtual queues 35a, in the specific ratio.

In another case to perform distributed printing on two printers of printers A and B by using a print job to print a document containing 1800 pages, the controller 31 of the distributed printing control apparatus 30 of the present example, as illustrated in FIG. 19, divides the 1800 pages into 18 job portions each containing a specific number of pages to be printed (100 pages in this case) and distributes the 18 job portions to the virtual queues 35a of the printer A and the printer B at the specific ratio according to the processing capacities of the printers A and B. At that time, since the processing capacity of the printer B is two times the processing capacity of the printer A, the distributed printing control apparatus 30 distributes, to the virtual queue 35a of the printer B, the job portions containing a number of pages being two times the number of pages contained in the job portions distributed to the virtual queue 35a of the printer A. Similarly to Example 1, the order of pages queued in one of the virtual queues 35a is opposite to that in the other so that the printers A and can print the pages in correct order even after one or more job portions are moved between the virtual queues. The controller 31 of the distributed printing control apparatus 30 further gives instructions to the printer A to perform face-down output of the printed pages and gives instructions to the printer B to perform face-up output of the printed pages. It should be noted that it is preferable that if the processing capacities of the printers is not the same, a print job is divided such that each job portion contains the number of pages that can be printed per unit time by the printer having the minimum processing capacity.

Then, the controller 31 of the distributed printing control apparatus 30 sends, to each of the printers A and B, a specific number of job portions from the corresponding virtual queue 35a, and starts the print processing of each of the printers. Since job portions were distributed to the virtual queues 35a at the specific ratio according to the processing capacities of the printers A and B in this case, the numbers of copies remaining to be printed in the virtual queues 35a of the printers A and B decrease with keeping the specific ratio. For example, as illustrated in FIG. 20, the printer A and the printer B finish the first to 300 pages and the 1800th to 1201th pages, respectively within three minutes, and after three minutes have elapsed the numbers of job portions in processing and job portions remaining to be processed in the printer A becomes 300 pages in total (the 301th to 400th pages in processing, the 401th to 500th pages in transferring and the 501th to 600th pages remaining in the virtual queue 35a) and the numbers of job portions in processing and job portions remaining to be processed in the printer B becomes 600 pages in total (the 1200th to 1101th pages in processing, the 1100th to 1001th pages in transferring and the 1000th to 601th pages remaining in the virtual queue 35a). Since the processing capacity of the printer B is two times the processing capacity of the printer A, the printers A and B finish the job processing at almost the same time. Accordingly, it becomes possible to eliminate the movement of job portions jobs between the virtual queues 35a.

Under a condition that some trouble arises in one of the printers, the controller 31 of the distributed printing control apparatus 30 may check the number of job portions remaining in each virtual queue 35a at specific times (for example, at time when a job portion or portions have been sent from the virtual queue 35a or at time when a prescribed period of time determined beforehand has elapsed), and move one or more job portions from one of the virtual queues 35a to the other so as to keep the numbers of pages remaining to be printed (each is preferably the total number of pages in processing and pages in transferring and pages remaining in the virtual queues, in order to accurately coincide the finishing times of job processing of the printers), in other words, the numbers of job portions remaining in the virtual queues 35a, in the specific ratio.

Example 3

Figure 21:
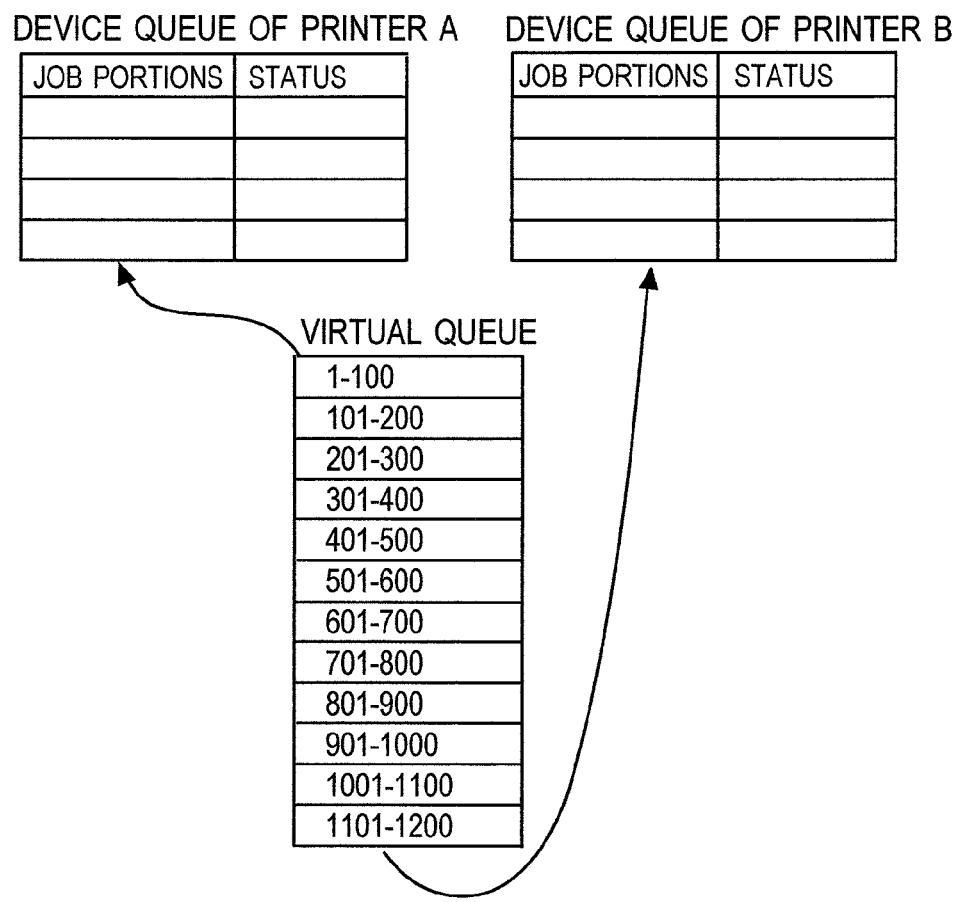
FIG. 21 is a schematic diagram illustrating an example of the constitution of a virtual queue according to Example 3.
Figure 22:
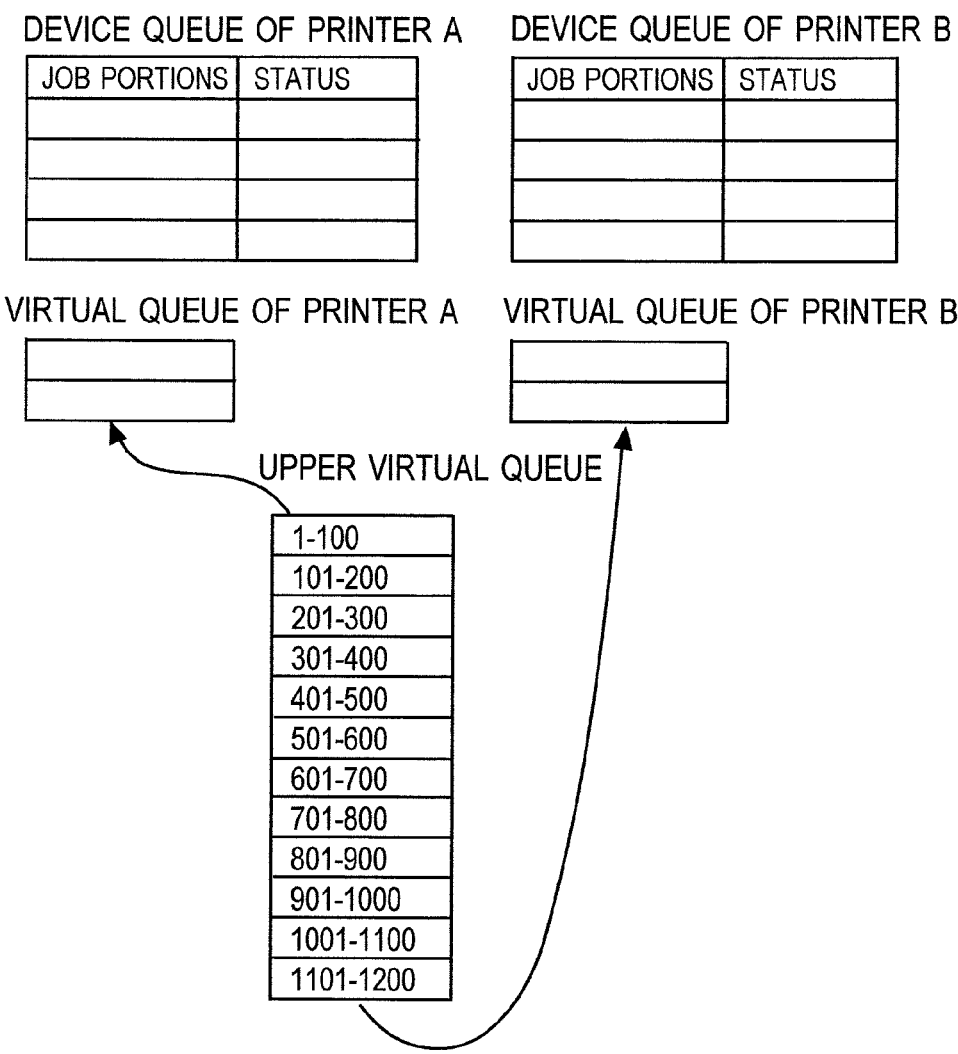
FIG. 22 is a schematic diagram illustrating another example of the constitution of a virtual queue according to Example 3.

Next, description will be given to a non-transitory computer-readable storage medium storing a distributed printing control program, a distributed printing control apparatus, and a distributed printing control method according to the second example with reference to FIG. 21 to FIG. 22. FIG. 21 and FIG. 22 each is a diagram illustrating a schematic diagram illustrating a constitution example of virtual queues of the present example.

In Example 1, the virtual queue 35a was prepared for each of the image forming apparatuses 40. When performing distributed printing on two image forming apparatuses 40, job control of the distributed printing can be performed by using one virtual queue 35a. In the distributed printing using one virtual queue 35a and including dividing a print job into job portions according to copies to be printed, the distributed printing control apparatus 30 may send the job portions successively from the head of the virtual queue 35a to both of the image forming apparatuses 40. In the distributed printing using one virtual queue 35a and including dividing a print job into job portions according to pages to be printed, the distributed printing control apparatus 30 may send the job portions successively from the head of the virtual queue 35a to one of the image forming apparatuses 40 (the printer A in this case) and send the job portions successively from the end of the virtual queue 35a to the other of the image forming apparatuses 40 (the printer in this case).

As another example illustrated in FIG. 22, the virtual queue 35a for each of the image forming apparatuses 40 and another virtual queue deposited at the upper position of the virtual queues 35a may be prepared. The distributed printing control apparatus 30 may successively move a certain number of job portions from the upper virtual queue to each of the virtual queues 35 of the respective image forming apparatuses 40 and then send the job portions from the virtual queues 35a to the respective image forming apparatuses 40.

Example 4

Figure 23:
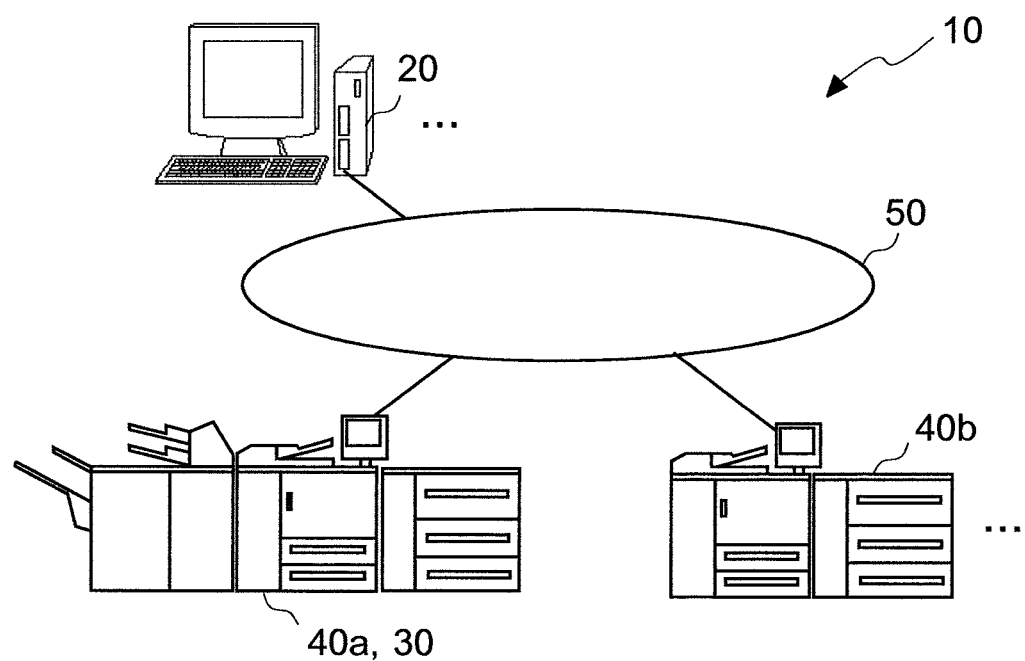
FIG. 23 is a drawing schematically illustrating an example of the constitution of a distributed printing system according to Example 4.
Figure 24A:
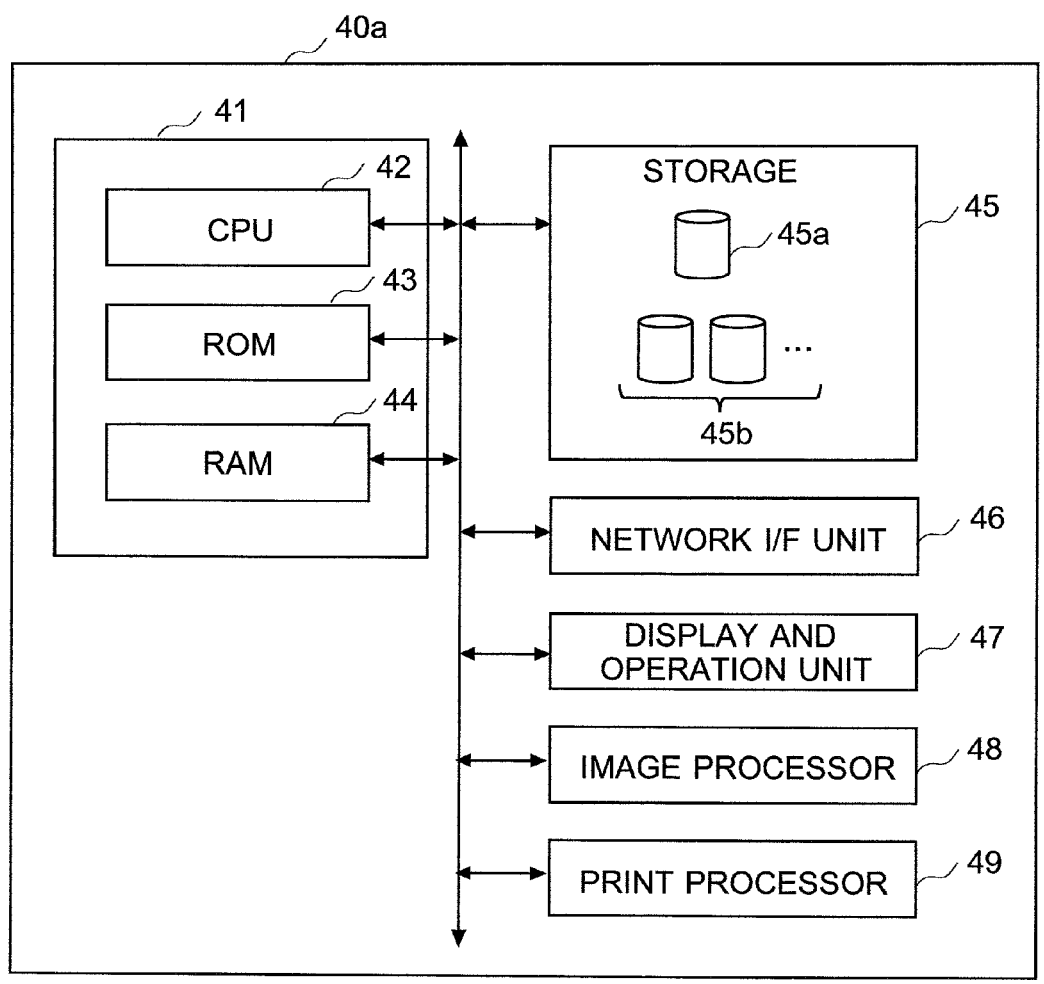
FIGS. 24A and 24B are block diagrams illustrating an example of the constitution of an image forming apparatus according to Example 4.
Figure 24B:
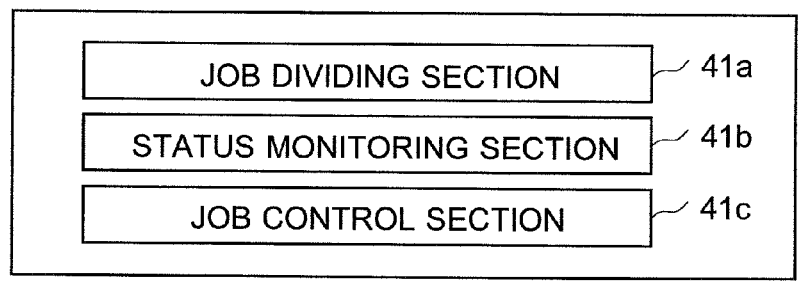

Next, description will be given to a non-transitory computer-readable storage medium storing a distributed printing control program, a distributed printing control apparatus, and a distributed printing control method according to the fourth example with reference to FIG. 23 and FIGS. 24A and 24B. FIG. 23 is a drawing illustrating schematically an example of the constitution of a distributed printing system of the present example, and FIGS. 24A and 24 are block diagrams illustrating an example of the constitution of an image forming apparatus.

In Example 1, the distributed printing system 10 included the distributed printing control apparatus 30. If any one of the image forming apparatuses 40 is capable of controlling distributed printing, the distributed printing system 10 may be constituted by client terminals 20 and a plurality of image forming apparatuses 40, and the distributed printing control apparatus 30 may be omitted.

In this distributed printing system 10, as illustrated in FIG. 23, the distributed printing system 10 includes client terminals 20 and image forming apparatuses 40a, 40b and so on as the plurality of image forming apparatuses 40, and the specific image forming apparatus 40a among the image forming apparatuses 40 is configured to serve as the distributed printing control apparatus 30 of Example 1 (illustrated in FIG. 1). In concrete terms, as illustrated in FIG. 24A, the specific image forming apparatus 40a includes a controller 41, a storage 45, a network interface (I/F) unit 46, a display and operation unit 47, an image processor 48 and a print processor 49. The storage 45 includes virtual queues 45b in addition to the device queue 45a. Further, the controller 41 is configured to work as the job dividing section 41a, the status monitoring section 41b, and the job control section 41c. In other words, the job dividing section 41a, the status monitoring section 41b, and the job control section 41c are provided by a distributed printing control program which causes the controller 41 to function as these sections when being executed by CPU 42.

In concrete terms, the job dividing section 41a divides a print job received from the client terminal 20 into plural job portions according to copies or pages to be printed (copy clusters each including a specific number of copies to be printed or page clusters each including a specific number of pages to be printed). The status monitoring section 41b monitors the status of job processing of each of the image forming apparatuses 40 on the basis of the printing status of the specific image forming apparatus 40a itself and the printing statuses obtained from the others of the image forming apparatuses 40, and judges whether or not there is no job portion waiting to be processed in any of the image forming apparatuses 40. The job control section 41c distributes job portions given by dividing a print job with the job dividing section 41a equally (alternatively, at a specific ratio corresponding to the processing capacities of the image forming apparatuses 40) to the virtual queues 45b prepared for the image forming apparatuses 40 including the specific image forming apparatus 40a itself, respectively. The job control section 41c further moves one or more job portions from one of the virtual queues 45b to another so as to keep the numbers of job portions remaining in the virtual queues 45b equal to each other (or in the specific ratio).

To realize the above-described job control of distributed printing, the specific image forming apparatus 40a performs the processing of the distributed printing control apparatus 30 illustrated in FIG. 7 and FIG. 8. In the steps of distributing job portions to virtual queues corresponding to the plurality of image forming apparatuses 40 and sending job portions to the plurality of image forming apparatuses 40 from the corresponding virtual queues, the specific image forming apparatus 40a specifies the virtual queues of the specific image forming apparatus 40a itself and the other image forming apparatuses as the destination to which the job portions are to be distributed and also specifies the specific image forming apparatus 40a itself and the other image forming apparatuses as the destination to which the job portions are to be sent. Such job control provides the same effect as that of Example 1, too.

In the distributed printing system 10 illustrated in FIG. 23, the specific image forming apparatus 40a serves as the distributed printing control apparatus 30 (by executing the distributed printing control program). Alternatively, a client terminal 20 may serve as the distributed printing control apparatus 30 (by executing the distributed printing control program).

The present invention should net be limited to the above examples, and the constitution and control may be modified appropriately, unless such modification deviates from the intention of the present invention.

For example, the above examples exemplify the case where a print job is divided into job portions each containing a same number of copies or pages to be printed. However, it is not necessary that every job portion contains a same number of copies or of pages to be printed. For example, if a print job divided by the number of the virtual queues leaves a remainder of copies or pages, the job portion at the end of the print job may contain a different number of copies or pages to be printed in comparison with those of the other job portions. Alternatively, a print job may be divided into job portions such that the number of copies or pages to be printed contained in a job portion gradually decreases as the position of the job portion goes from the head to the end of job portions queued in the virtual queue. It can make the job portion with a high possibility to be moved among the virtual queues, contain a small number of copies or pages, and thereby can accurately coincide the finishing time of job processing of the image forming apparatuses.

In the above examples, the redistribution of job portions was executed at a time when a job portion is output from a virtual queue to the corresponding image forming apparatus or at certain intervals of time. Alternatively, the redistribution of job portions may be executed at different intervals. For example, the execution interval of the redistribution may be made long immediately after job processing has been started, and as the job processing advances more, the execution interval of the redistribution may be shortened. Such job control can accurately coincide the finishing time of job processing of the image forming apparatuses.

The present invention is applicable to distributed printing control programs to be executed by an apparatus in a distributed printing system which includes plural image forming apparatuses, non-transitory computer-readable storage medium each storing the distributed printing control program, distributed printing control apparatus which controls distributed printing to be performed on plural image forming apparatuses, and distributed printing control methods.

The invention claimed is:

1. A non-transitory computer-readable storage medium storing a program for controlling distributed printing to be executed in a distributed printing system including at least a plurality of image forming apparatuses on which a print job is to be processed, each of the plurality of image forming apparatuses having a memory which includes a device queue, an apparatus in the distributed printing system being configured to control the image forming apparatuses and having a memory which includes a plurality of virtual queues corresponding to the image forming apparatuses, respectively, the program, when being executed by a processor of the apparatus in the distributed printing system, causing the apparatus to perform processing comprising:
dividing a print job into a plurality of job portions;
distributing the plurality of job portions to the plurality of virtual queues in the apparatus;
sequentially sending, to the device queue of each of the image forming apparatuses, job portions in the virtual queue corresponding to each of the image forming apparatuses, in accordance with a status of job processing of each of the image forming apparatuses; and
moving one or more job portions from one to another of the plurality of virtual queues so as to cause the image forming apparatuses to finish processing the job portions in the respective virtual queues at the same time.

2. The non-transitory computer-readable storage medium of claim 1, wherein the dividing the print job includes dividing the print job into a plurality of job pieces each containing a specific number of copies to be printed or a specific number of pages to be printed.

3. The non-transitory computer-readable storage medium of claim 2, wherein:
the plurality of image forming apparatuses have different processing capacities, and
the dividing the print job includes:
dividing the print job into a plurality of job portions each containing a number of copies or a number of pages which can be printed per unit time by an image forming apparatus having the minimum processing capacity among the plurality of image forming apparatuses.

4. The non-transitory computer-readable storage medium of claim 2, wherein the sending job portions includes:
sequentially sending, to each of the plurality of image forming apparatuses, job portions in the virtual queue corresponding to the each of the plurality of image forming apparatuses so that one job portion is waiting to be processed in each of the plurality of image forming apparatuses.

5. The non-transitory computer-readable storage medium of claim 2, wherein:
the distributing the plurality of job portions includes:
distributing the plurality of job portions to the plurality of virtual queues equally, and
the moving one or more job portions includes:
moving one or more job portions from one to another of the plurality of virtual queues so as to keep the numbers of job portions remaining in the plurality of virtual queues equal to each other.

6. The non-transitory computer-readable storage medium of claim 5, wherein:
the plurality of image forming apparatuses are a first image forming apparatus and a second image forming apparatus,
the dividing the print job includes:
dividing the print job into a plurality of job portions each containing a specific number of pages to be printed,
the distributing the plurality of job portions includes:
distributing the plurality of job portions to the virtual queues of the first image forming apparatus and the second image forming apparatus so that pages contained in the job portions queued in the virtual queue of the first image forming apparatus are in ascending order and pages contained in the job portions queued in the virtual queue of the second image forming apparatus are in descending order, and
the moving one or more job portion includes:
moving one or more job portions at an end of one of the virtual queues to an end of the other of the virtual queues.

7. The non-transitory computer-readable storage medium of claim 6, wherein the sending job portions includes:
instructing the first image forming apparatus to output printed pages with printed sides facing down, and
instructing the second image forming apparatus to output printed pages with printed sides facing up.

8. The non-transitory computer-readable storage medium of claim 2, wherein:
the distributing the plurality of job portions includes:
distributing the plurality of job portions to the plurality of virtual queues at a specific ratio according to processing capacities of the plurality of image forming apparatuses, and
the moving one or more job portions includes:
moving one or more job portions from one to another of the plurality of virtual queues so as to keep the numbers of job portions remaining in the plurality of virtual queues in the specific ratio.

9. The non-transitory computer-readable storage medium of claim 8, wherein:
the plurality of image forming apparatuses are a first image forming apparatus and a second image forming apparatus,
the dividing the print job includes:
dividing the print job into a plurality of job portions each containing a specific number of pages to be printed,
the distributing the plurality of job portions includes:
distributing the plurality of job portions to the virtual queues of the first image forming apparatus and the second image forming apparatus so that pages contained in the job portions queued in the virtual queue of the first image forming apparatus are in ascending order and pages contained in the job portions queued in the virtual queue of the second image forming apparatus are in descending order, and
the moving one or more job portion includes:
moving one or more job portions at an end of one of the virtual queues to an end of the other of the virtual queues.

10. The non-transitory computer-readable storage medium of claim 9, wherein the sending job portions includes:
instructing the first image forming apparatus to output printed pages with printed sides facing down, and
instructing the second image forming apparatus to output printed pages with printed sides facing up.

11. The non-transitory computer-readable storage medium of claim 1, wherein the apparatus defines the plurality of image forming apparatuses as one group of image forming apparatuses on which a print job is to be processed, in advance to control the plurality of the image forming apparatuses to process a print job.

12. The non-transitory computer-readable storage medium of claim 1,
wherein the device queue of each of the image forming apparatuses stores two or more job portions sent from the corresponding virtual queue.

13. A distributed printing control apparatus which controls a plurality of image forming apparatuses on which a print job is to be processed, each of the plurality of image forming apparatuses having a memory which includes a device queue, the distributed printing control apparatus comprising:
at least one hardware processor which is configured to:
prepare, in a memory, a plurality of virtual queues corresponding to the plurality of image forming apparatuses, respectively;
divide a print job into a plurality of job portions;
monitor a status of job processing of each of the plurality of image forming apparatuses;
distribute the plurality of job portions to the plurality of virtual queues,
sequentially send, to the device queue of each of the image forming apparatuses, job portions in the virtual queue corresponding to each of the image forming apparatuses, in accordance with a status of job processing of each of the image forming apparatuses, and
move one or more job portions from one to another of the plurality of virtual queues so as to cause the image forming apparatuses to finish processing the job portions in the respective virtual queues at the same time.

14. The distributed printing control apparatus of claim 13, wherein the print job is divided into a plurality of job pieces each containing a specific number of copies to be printed or a specific number of pages to be printed.

15. The distributed printing control apparatus of claim 14, wherein:
the plurality of image forming apparatuses have different processing capacities, and
the hardware processor divides the print job into a plurality of job portions each containing a number of copies or a number of pages which can be printed per unit time by an image forming apparatus having the minimum processing capacity among the plurality of image forming apparatuses.

16. The distributed printing control apparatus of claim 14, wherein the hardware processor sequentially sends, to each of the plurality of image forming apparatuses, job portions in the virtual queue corresponding to each of the plurality of image forming apparatuses so that one job portion is waiting to be processed in each of the plurality of image forming apparatuses.

17. The distributed printing control apparatus of claim 14, wherein the hardware processor:
distributes the plurality of job portions to the plurality of virtual queues equally, and
moves one or more job portions from one to another of the plurality of virtual queues so as to keep the numbers of job portions remaining in the plurality of virtual queues equal to each other.

18. The distributed printing control apparatus of claim 17, wherein:
the plurality of image forming apparatuses are a first image forming apparatus and a second image forming apparatus, and
the hardware processor:
divides the print job into a plurality of job portions each containing a specific number of pages to be printed,
distributes the plurality of job portions to the virtual queues of the first image forming apparatus and the second image forming apparatus so that pages contained in the job portions queued in the virtual queue of the first image forming apparatus are in ascending order and pages contained in the job portions queued in the virtual queue of the second image forming apparatus are in descending order, and
moves the one or more job portions at an end of one of the virtual queues to an end of the other of the virtual queues.

19. The distributed printing control apparatus of claim 18, wherein the hardware processor:
instructs the first image forming apparatus to output printed pages with printed sides facing down, and
instructs the second image forming apparatus to output printed pages with printed sides facing up.

20. The distributed printing control apparatus of claim 14, wherein the hardware processor:
distributes the plurality of job portions to the plurality of virtual queues at a specific ratio according to processing capacities of the plurality of image forming apparatuses, and
moves one or more job portions from one to another of the plurality of virtual queues so as to keep the numbers of job portions remaining in the plurality of virtual queues in the specific ratio.

21. The distributed printing control apparatus of claim 20, wherein:

the plurality of image forming apparatuses are a first image forming apparatus and a second image forming apparatus, and the hardware processor:

divides the print job into a plurality of job portions each containing a specific number of pages to be printed, distributes the plurality of job portions to the virtual queues of the first image forming apparatus and the second image forming apparatus so that pages contained in the job portions queued in the virtual queue of the first image forming apparatus are in ascending order and pages contained in the job portions queued in the virtual queue of the second image forming apparatus are in descending order, and moves the one or more job portions at an end of one of the virtual queues to an end of the other of the virtual queues.

22. The distributed printing control apparatus of claim 21, wherein the hardware processor:

instructs the first image forming apparatus to output printed pages printed sides facing down, and instructs the second image forming apparatus to output printed pages with printed sides facing up.

23. The distributed printing control apparatus of claim 13, wherein the hardware processor defines the plurality of image forming apparatuses as one group of image forming apparatuses on which a print job is to be processed, in advance to control the plurality of the image forming apparatuses to process a print job.

24. The non-transitory computer-readable storage medium of claim 13, wherein the device queue of each of the image forming apparatuses stores two or more job portions sent from the corresponding virtual queue.

* * * * *